United States Patent
Dara et al.

(10) Patent No.: US 11,891,710 B2
(45) Date of Patent: *Feb. 6, 2024

(54) LI RECOVERY PROCESSES AND ONSITE CHEMICAL PRODUCTION FOR LI RECOVERY PROCESSES

(71) Applicant: Mangrove Water Technologies LTD., Vancouver (CA)

(72) Inventors: Saad Dara, Vancouver (CA); Beniamin Zahiri, Vancouver (CA)

(73) Assignee: MANGROVE WATER TECHNOLOGIES LTD., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,190

(22) Filed: Apr. 3, 2023

(65) Prior Publication Data

US 2023/0304172 A1 Sep. 28, 2023

Related U.S. Application Data

(63) Continuation of application No. 17/883,983, filed on Aug. 9, 2022, which is a continuation of application (Continued)

(51) Int. Cl.
    *C25B 9/17* (2021.01)
    *C25B 9/23* (2021.01)
    (Continued)

(52) U.S. Cl.
    CPC ............... *C25B 9/23* (2021.01); *B01D 61/46* (2013.01); *B01D 61/463* (2022.08); *B01D 69/02* (2013.01);
    (Continued)

(58) Field of Classification Search
    CPC .......... C01D 7/00; C01D 15/02; C01D 15/04; C01D 15/08; C25B 1/14; C25B 1/34;
    (Continued)

(56) References Cited

U.S. PATENT DOCUMENTS 2,020,854 A    11/1935   Rosett et al.
2,516,109 A    7/1950   Ellestad et al.
(Continued)

FOREIGN PATENT DOCUMENTS

CN      1511964 A    7/2004
CN      1894821 A    1/2007
(Continued)

OTHER PUBLICATIONS

Extended European Search Report for European Application No. 23 167 855.8, dated Jul. 14, 2023, 11 pages.
(Continued)

*Primary Examiner* — Zulmariam Mendez
(74) *Attorney, Agent, or Firm* — RatnerPrestia

(57) ABSTRACT

In this disclosure, a process of recycling acid, base and the salt reagents required in the Li recovery process is introduced. A membrane electrolysis cell which incorporates an oxygen depolarized cathode is implemented to generate the required chemicals onsite. The system can utilize a portion of the salar brine or other lithium-containing brine or solid waste to generate hydrochloric or sulfuric acid, sodium hydroxide and carbonate salts. Simultaneous generation of acid and base allows for taking advantage of both chemicals during the conventional Li recovery from brines and mineral rocks. The desalinated water can also be used for the washing steps on the recovery process or returned into the evaporation ponds. The method also can be used for the direct conversion of lithium salts to the high value LiOH product. The method does not produce any solid effluent
(Continued)

which makes it easy-to-adopt for use in existing industrial Li recovery plants.

22 Claims, 25 Drawing Sheets

Related U.S. Application Data

No. 17/416,413, filed as application No. PCT/IB2019/001346 on Dec. 19, 2019, now Pat. No. 11,634,826.

(60) Provisional application No. 62/907,486, filed on Sep. 27, 2019, provisional application No. 62/784,324, filed on Dec. 21, 2018.

(51) Int. Cl.

| | |
|---|---|
| *C25B 11/032* | (2021.01) |
| *C25B 11/052* | (2021.01) |
| *C25B 9/21* | (2021.01) |
| *B01D 69/02* | (2006.01) |
| *C01D 15/02* | (2006.01) |
| *C01D 15/04* | (2006.01) |
| *C01D 15/08* | (2006.01) |
| *C01F 5/24* | (2006.01) |
| *C01F 11/18* | (2006.01) |
| *C02F 1/461* | (2023.01) |
| *C02F 1/469* | (2023.01) |
| *C25B 1/16* | (2006.01) |
| *C25C 1/02* | (2006.01) |
| *C25C 7/02* | (2006.01) |
| *C25C 7/04* | (2006.01) |
| *C25B 11/048* | (2021.01) |
| *C25B 11/046* | (2021.01) |
| *C25B 9/19* | (2021.01) |
| *C25B 11/053* | (2021.01) |
| *C25B 13/00* | (2006.01) |
| *B01D 61/46* | (2006.01) |
| *C02F 101/10* | (2006.01) |
| *C02F 103/08* | (2006.01) |
| *C02F 103/10* | (2006.01) |

(52) U.S. Cl.
CPC ............ *C01D 15/02* (2013.01); *C01D 15/04* (2013.01); *C01D 15/08* (2013.01); *C01F 5/24* (2013.01); *C01F 11/181* (2013.01); *C02F 1/4693* (2013.01); *C02F 1/46109* (2013.01); *C25B 1/16* (2013.01); *C25B 9/19* (2021.01); *C25B 9/21* (2021.01); *C25B 11/032* (2021.01); *C25B 11/046* (2021.01); *C25B 11/048* (2021.01); *C25B 11/052* (2021.01); *C25B 11/053* (2021.01); *C25B 13/00* (2013.01); *C25C 1/02* (2013.01); *C25C 7/02* (2013.01); *C25C 7/04* (2013.01); *B01D 2313/345* (2013.01); *B01D 2325/10* (2013.01); *B01D 2325/36* (2013.01); *B01D 2325/38* (2013.01); *B01D 2325/42* (2013.01); *C02F 2001/46142* (2013.01); *C02F 2001/46166* (2013.01); *C02F 2101/10* (2013.01); *C02F 2103/08* (2013.01); *C02F 2103/10* (2013.01)

(58) Field of Classification Search
CPC ....... C25B 9/23; C25B 11/032; C25B 11/052; C25B 1/16; C25C 1/02; C25C 7/02; C25C 7/04; B01D 1/46; B01D 69/02
See application file for complete search history.

(56) References Cited

U.S. PATENT DOCUMENTS

| | | | |
|---|---|---|---|
| 2,793,933 | A | 5/1957 | Kroll et al. |
| 2,829,095 | A | 4/1958 | Kenichi et al. |
| 2,983,576 | A | 5/1961 | Robinson |
| 3,424,563 | A | 1/1969 | Grinstead |
| 3,855,392 | A | 12/1974 | Folkestad et al. |
| 4,036,713 | A | 7/1977 | Brown |
| 4,191,618 | A | 3/1980 | Coker et al. |
| 4,207,297 | A | 6/1980 | Brown et al. |
| 4,217,186 | A | 8/1980 | McRae |
| 4,261,960 | A | 4/1981 | Boryta |
| 4,299,682 | A | 11/1981 | Oda et al. |
| 4,415,413 | A | 11/1983 | Veber |
| 4,584,080 | A | 4/1986 | Staab et al. |
| 4,877,694 | A | 10/1989 | Solomon et al. |
| 4,980,037 | A | 12/1990 | Hossain et al. |
| 4,980,136 | A | 12/1990 | Brown et al. |
| 5,246,551 | A | 9/1993 | Pletcher et al. |
| 5,567,293 | A | 10/1996 | Paleologou et al. |
| 5,939,038 | A | 8/1999 | Wilkomirsky |
| 5,993,759 | A | 11/1999 | Wilkomirsky |
| 6,048,507 | A | 4/2000 | Amouzegar et al. |
| 6,117,286 | A | 9/2000 | Shimamune et al. |
| 6,143,260 | A | 11/2000 | Boryta |
| 6,217,728 | B1 | 4/2001 | Lehmann et al. |
| 8,641,922 | B2 | 2/2014 | Viloria et al. |
| 8,691,169 | B2 | 4/2014 | Perez et al. |
| 9,169,125 | B2 | 10/2015 | Kang et al. |
| 9,601,779 | B2 | 3/2017 | Visco et al. |
| 10,144,990 | B2 | 12/2018 | Bourassa et al. |
| 10,718,057 | B1 | 7/2020 | Freiderich |
| 2007/0248885 | A1 | 10/2007 | Bannai et al. |
| 2010/0021777 | A1* | 1/2010 | Gottesfeld ............ H01M 4/881 |
| | | | 429/429 |
| 2011/0044882 | A1 | 2/2011 | Buckley et al. |
| 2011/0203929 | A1 | 8/2011 | Buckley et al. |
| 2013/0037415 | A1 | 2/2013 | Izawa et al. |
| 2013/0146476 | A1 | 6/2013 | Chon et al. |
| 2014/0023940 | A1 | 1/2014 | Zaghib et al. |
| 2015/0240368 | A1 | 8/2015 | Iacopetti et al. |
| 2018/0147531 | A1 | 5/2018 | Park et al. |
| 2018/0244531 | A1 | 8/2018 | Magnan et al. |
| 2019/0048483 | A1 | 2/2019 | Swonger et al. |

FOREIGN PATENT DOCUMENTS

| | | |
|---|---|---|
| CN | 103031568 A | 4/2013 |
| CN | 103415953 A | 11/2013 |
| CN | 104628217 A | 5/2015 |
| CN | 106011917 A | 10/2016 |
| CN | 108341420 A | 7/2018 |
| GB | 804921 | 11/1958 |
| JP | 11172484 A | 6/1999 |
| JP | 2011031232 A | 2/2011 |
| JP | 2011518257 A | 6/2011 |
| JP | 2011258489 A | 12/2011 |
| KR | 1020160075679 A | 6/2016 |
| WO | 2013036983 A1 | 3/2013 |
| WO | 2015149185 A1 | 10/2015 |
| WO | 2020086000 A1 | 4/2020 |

OTHER PUBLICATIONS

Extended European Search Report for European Application No. 23 167 858.2, dated Jul. 14, 2023, 11 pages.
Australian Examination Report for Australian Application No. 2021290346, dated Mar. 19, 2022, 5 pages.
Bradbury, Energy Storage Technology Review, 2010, 34 pages.
Brandt et al., "New Concepts for Lithium Minerals Processing", Minerals Engineering, 2010, vol. 23, pp. 659-661.
Büyükburc et al., "Extraction of Lithium from Boron Clays by Using Natural and Waste Materials and Statistical Modelling to Achieve Cost Reduction", Minerals Engineering, 2006, vol. 19, pp. 515-517.

(56) References Cited

OTHER PUBLICATIONS

Canadian Examination Report for Canadian Application No. 3124281, dated Aug. 24, 2021, 4 pages.
Canadian Office Action for Canadian Application No. 3,124,281, dated Mar. 2, 2022, 6 pages.
Chen et al., "Preparation of Lithium Carbonate From Spodumene by A Sodium Carbonate Autoclave Process", Hydrometallurgy, 2011, vol. 109, pp. 43-46.
Chinese Office Action for Chinese Application No. 201980092809.2, dated Aug. 8, 2022, with translation, 33 pages.
Chinese Office Action for Chinese Application No. 201980092809.2, dated Jan. 30, 2022, with translation, 13 pages. 2022.
Clarke et al., "Lithium-Ion Batteries", American Institute of Chemical Engineers, 2015, 32 pages.
Distin et al., "The Acid Extraction of Lithium From the Granites of South West England", Hydrometallurgy, 1982, vol. 9, pp. 1-14.
Ellestad et al., "Extraction of Lithium from Its Ores", Mining Engineering, 1955, pp. 1045-1047.
European Partial Supplementary Search Report for European Application No. 19900554.7 dated Jun. 24, 2022, 23 pages.
Helvaci et al., "Presence and Distribution of Lithium in Borate Deposits and Some Recent Lake Waters of West-Central Turkey", International Geology Review, 2004, vol. 46, pp. 177-190.
International Preliminary Report on Patentability for International Application No. PCT/IB2019/001346, dated Jun. 16, 2021, 6 pages.
International Search Report and Written Opinion for International Application No. PCT/IB2019/001346, dated May 28, 2020, 9 pages. 2020.
Jandová et al., "Processing of Zinnwaldite Waste to Obtain $Li_2CO_3$", Hydrometallurgy, 2010, vol. 103, pp. 12-18.
Korean Notification of Reason for Refusal for Korean Application No. 10-2021-7022179, dated Dec. 8, 2021 with translation, 10 pages.
McKetta, "Lithium and Lithium Compounds", Encyclopedia of Chemical Processing and Design, vol. 28, pp. 324-344.
Moon et al., "Surface Crystal Chemistry in Selective Flotation of Spodumene ($liAl[SiO_3]_2$) From Other Aluminosilicates", Int. J. Miner. Process., 2003, vol. 72, pp. 11-24.
Moore, "Lithium Supply May Not Be Sufficient for Electric Car Battery Production Study Finds", 2007, downloaded from the internet at https://www.prweb.com/releases/2007/01/prweb500533.htm, 3 pages.
Non Final Office Action for U.S. Appl. No. 17/883,767, dated Nov. 25, 2022, 28 pages.
Non Final Office Action for U.S. Appl. No. 17/883,850, dated Dec. 14, 2022, 26 pages.
Non Final Office Action for U.S. Appl. No. 17/883,969, dated Dec. 8, 2022, 29 pages.
Saeki et al., "Co-Grinding $LiCoO_2$ with PVC and Water Leaching of Metal Chlorides Formed in Ground Product", Int. J. Miner. Process., 2004, vol. 74S, pp. S373-S378.
Tahil, W., "How much lithium does a Lilion EV battery really need?", Meridian Int. Res., Mar. 5, 2010, 11 pages.
Technical Data Sheet—fumion FAA-3 Solution in NMP (10%), 1 page.
"The Trouble with Lithium 2 Under the Microscope", Meridian International Research, 2008, 58 pages.
Entire patent prosecution history of U.S. Appl. No. 17/416,413, filed Jun. 18, 2021, entitled, "Li Recovery Processes and Onsite Chemical Production for Li Recovery Processes".
Entire patent prosecution history of U.S. Appl. No. 17/883,767, filed Aug. 9, 2022, entitled, "Li Recovery Processes and Onsite Chemical Production for Li Recovery Processes".
Entire patent prosecution history of U.S. Appl. No. 17/883,850, filed Aug. 9, 2022, entitled, "Li Recovery Processes and Onsite Chemical Production for Li Recovery Processes".
Entire patent prosecution history of U.S. Appl. No. 17/883,969, filed Aug. 9, 2022, entitled, "Li Recovery Processes and Onsite Chemical Production for Li Recovery Processes".
Entire patent prosecution history of U.S. Appl. No. 17/883,983, filed Aug. 9, 2022, entitled, "Li Recovery Processes and Onsite Chemical Production for Li Recovery Processes".
Ji et al., "Preliminary Study on Recovering Lithium From High Mg2+/Li+ Ratio Brines By Electrodialysis", Separation and Purification Technology, 2017, vol. 172, pp. 168-177.
Korean Request for Submission of an Opinion for Korean Application No. 10-2022-7020732, dated Feb. 14, 2023 with translation, 23 pages.

\* cited by examiner

Bi-layer GDE/anion exchange
membrane in cell assembly

FIG. 26: Current vs. time plot for an embodiment of the membrane electrolysis cell utilizing a single layer GDE
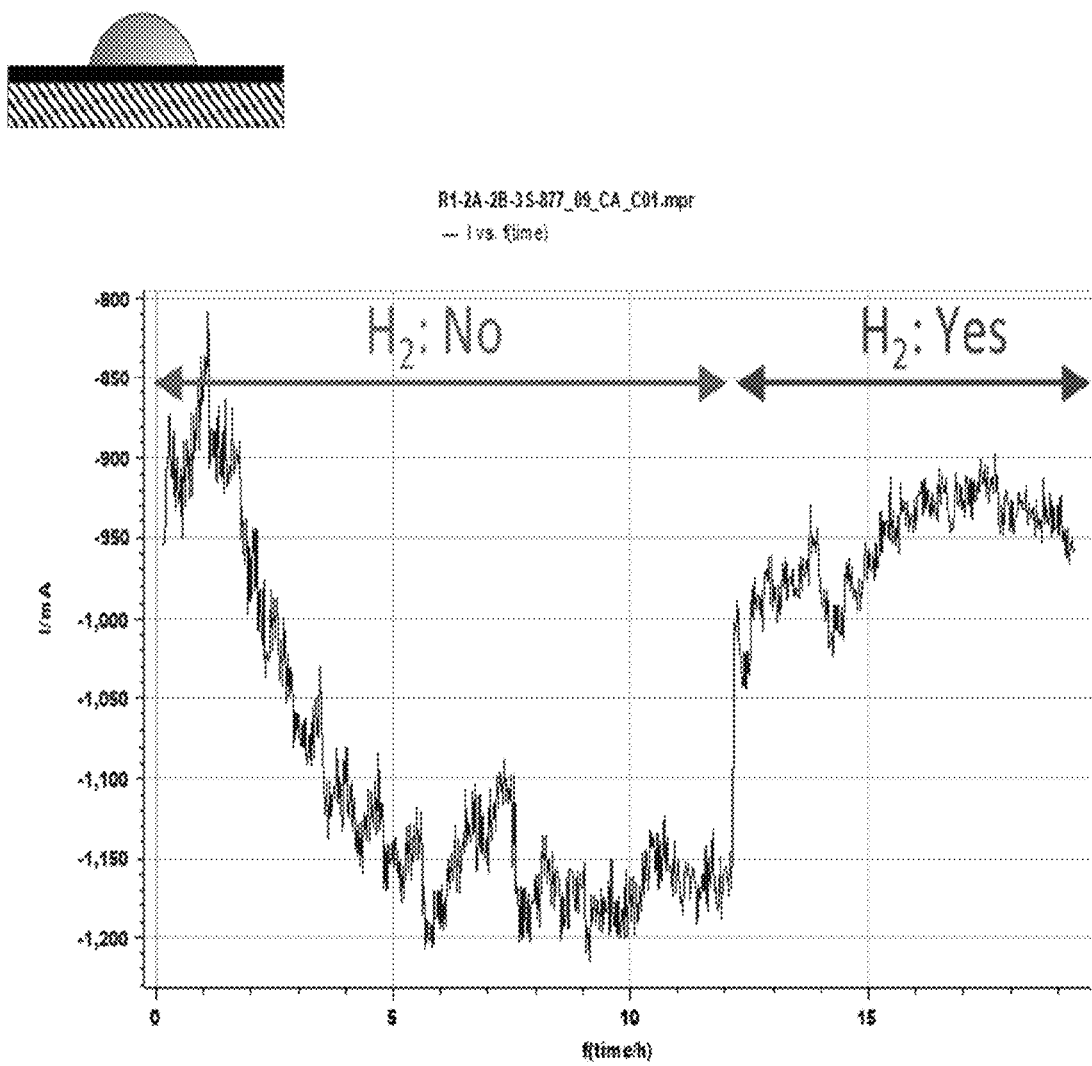

FIG. 27: Current vs. time plot for an embodiment of the membrane electrolysis cell utilizing a bilayer GDE according to the invention, with $O_2$ applied at the cathode
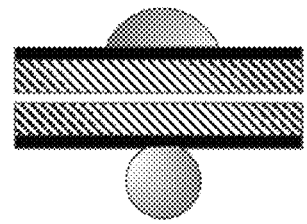
New GDE Design
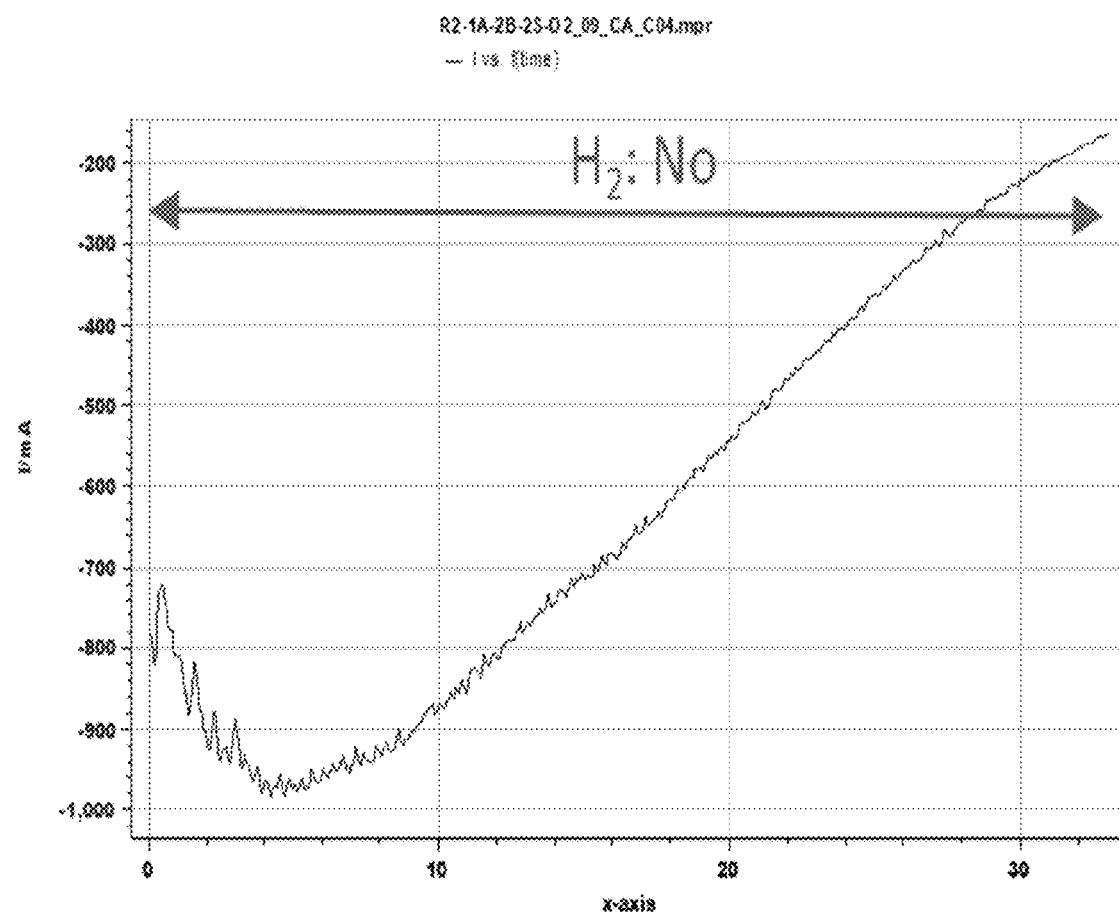

FIG. 28: Current vs. Time plot
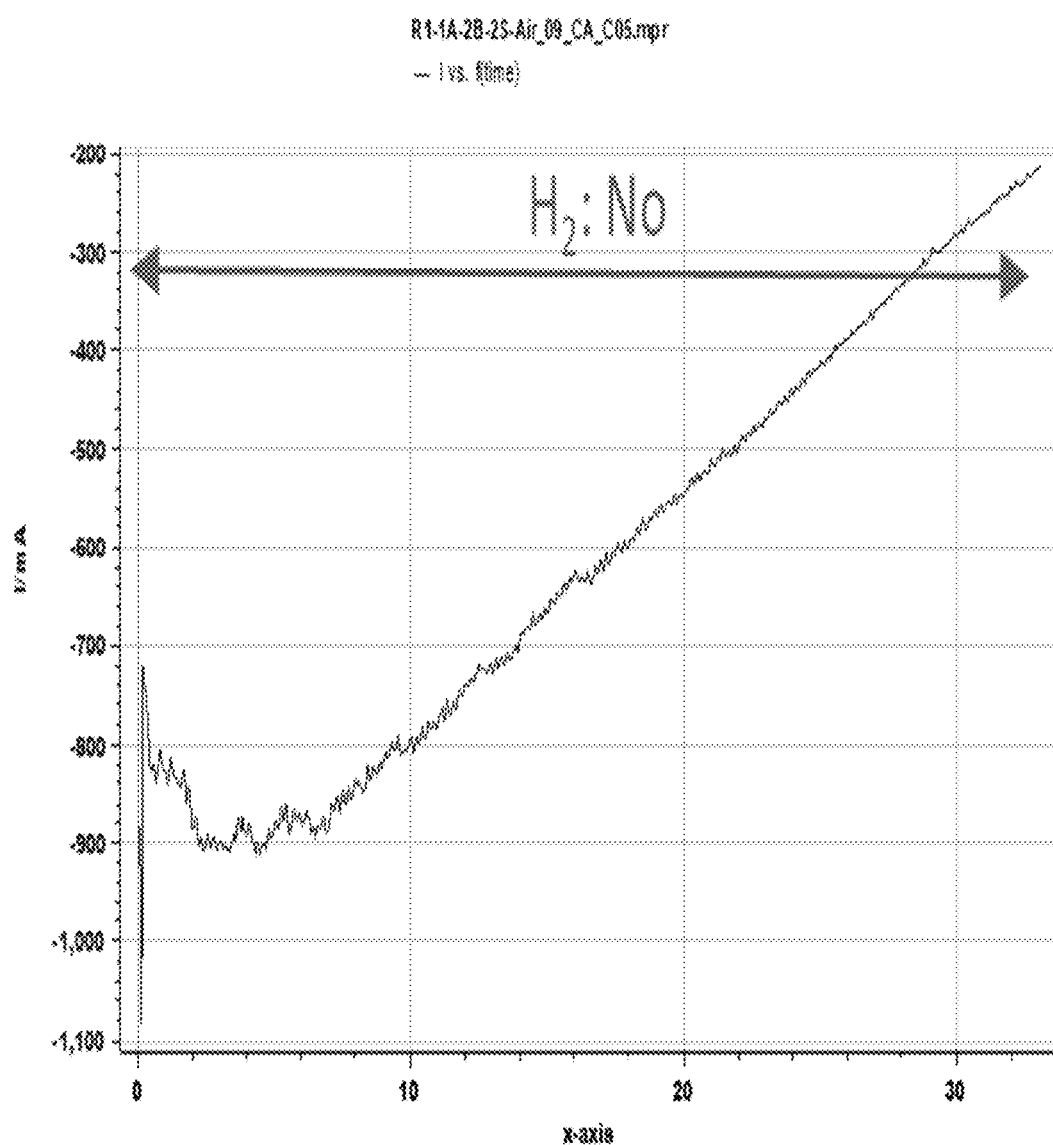

LI RECOVERY PROCESSES AND ONSITE CHEMICAL PRODUCTION FOR LI RECOVERY PROCESSES

CROSS-REFERENCE TO RELATED APPLICATION

This is a continuation application of U.S. application Ser. No. 17/883,983, filed Aug. 9, 2022, which is a continuation application of Ser. No. 17/416,413, filed Jun. 18, 2021, which is the U.S. National Phase of International Application No. PCT/IB2019/001346, filed Dec. 19, 2019, which claims priority to U.S. Provisional Application No. 62/784,324, filed Dec. 21, 2018, and U.S. Provisional Application No. 62/907,486, filed Sep. 27, 2019, the contents each of which are incorporated herein by reference in their entireties for all purposes.

FIELD OF THE INVENTION

This invention relates generally to Li recovery processes and the onsite production of chemicals used in Li recovery processes. The invention can be used to improve Li extraction from various sources, including brine sources or lithium ore sources where hydrochloric acid, sodium hydroxide, and/or sulfuric acid may be required. The invention can eliminate the need to outsource the acid and base feed materials by utilizing the already available brine onsite, whether derived from salar brine or a brine solution that is produced in the lithium ore refining process or a brine produced during a lithium ion battery recycling process. The invention can also be used to directly convert lithium containing salts, e.g. lithium chloride or lithium sulfate, to higher value lithium hydroxide product. The invention can also provide a gas diffusion electrode configured for use in a membrane electrolysis cell and a method of producing the gas diffusion electrode. Additionally, the invention can provide a membrane electrolysis cell for processing a salt-containing solution. The invention can also provide a process for purifying or concentrating or producing LiOH using a membrane electrolysis cell.

BACKGROUND OF THE INVENTION

Lithium has found an ever-increasing attention over the past few decades due to the advent of lithium ion batteries (LIBs) as the main source of energy storage for automobile and electronic application. The electric vehicle (EV) market, which is heavily depending on LIBs, is also expanding at record pace over the last decade and is expected to share 20% of the transportation market with internal combustion engines. Renewable energy generation including solar and wind applications are also expected to rely on LIBs for load leveling purposes. Recovering, such as by recycling Li from LIBs, is considered to be a secondary resource for lithium. Beside batteries, Li also has applications in glass and ceramics, chemicals and pharmaceuticals, metallurgicals and greases. Accordingly, there remains a growing need for improved Li recovery processes and related equipment.

SUMMARY OF THE INVENTION

Disclosed herein as an aspect of this invention is a gas diffusion electrode for use in a membrane electrolysis cell. The gas diffusion electrode comprises a diffusion layer configured to diffuse a gas; a hydrophilic catalyst layer disposed on a surface of the diffusion layer, the hydrophilic catalyst layer having a hydrophilicity greater than that of the diffusion layer and being capable of transporting negative ions; and an ion exchange membrane disposed on a surface of the hydrophilic catalyst layer, the ion exchange membrane being configured to exchange ions from the hydrophilic catalyst layer to an opposed surface of the ion exchange membrane.

Also disclosed according to another aspect of this invention is a method of producing a gas diffusion electrode for use in a membrane electrolysis cell. The method comprises disposing a hydrophilic catalyst layer on a surface of a diffusion layer, the hydrophilic catalyst layer having a hydrophilicity greater than that of the diffusion layer; and disposing an ion exchange membrane on a surface of the catalyst layer, the ion exchange membrane being configured to exchange ions from the catalyst layer to an opposed surface of the ion exchange membrane and to prevent flooding of the catalyst layer.

A membrane electrolysis cell for processing a salt-containing solution is also disclosed according to another aspect of this invention. The membrane electrolysis cell comprises an inlet through which the salt-containing solution is introduced into an interior of the membrane electrolysis cell; an anode positioned to extend within the interior of the membrane electrolysis cell and positioned in an anode compartment; a cathode comprising a gas diffusion electrode positioned to extend within the interior of the membrane electrolysis cell and positioned in a cathode compartment, the gas diffusion electrode including a diffusion layer configured to diffuse gas and a hydrophilic catalyst layer disposed on a surface of the diffusion layer, the hydrophilic catalyst layer having a hydrophilicity greater than that of the diffusion layer and the hydrophilic catalyst layer being configured to transport negative ions; a gas inlet through which a gas comprising $O_2$ is introduced into contact with the gas diffusion electrode; a first ion exchange membrane interposed between the anode compartment and the hydrophilic catalyst layer of the gas diffusion electrode, the first ion exchange membrane being configured to exchange ions received from the anode to an opposed surface of the first ion exchange membrane; and at least one outlet through which a product of the salt solution is removed from an interior of the membrane electrolysis cell.

Finally, a process for purifying or concentrating LiOH using a membrane electrochemical cell is disclosed according to yet another aspect of this invention.

BRIEF DESCRIPTION OF THE DRAWINGS

FIG. 26 shows a current vs. time plot for a membrane electrolysis cell utilizing a single layer GDE with pure oxygen applied at the cathode;

FIG. 27 shows a current vs. time plot for a membrane electrolysis cell utilizing bilayer GDE as an ODC, with pure oxygen applied at the cathode; and FIG. 28 shows a current vs. time plot for a membrane electrolysis cell utilizing bilayer GDE as an ODC, with air applied at the cathode.

DETAILED DESCRIPTION OF THE CERTAIN EMBODIMENTS OF THE INVENTION

Figure 1:
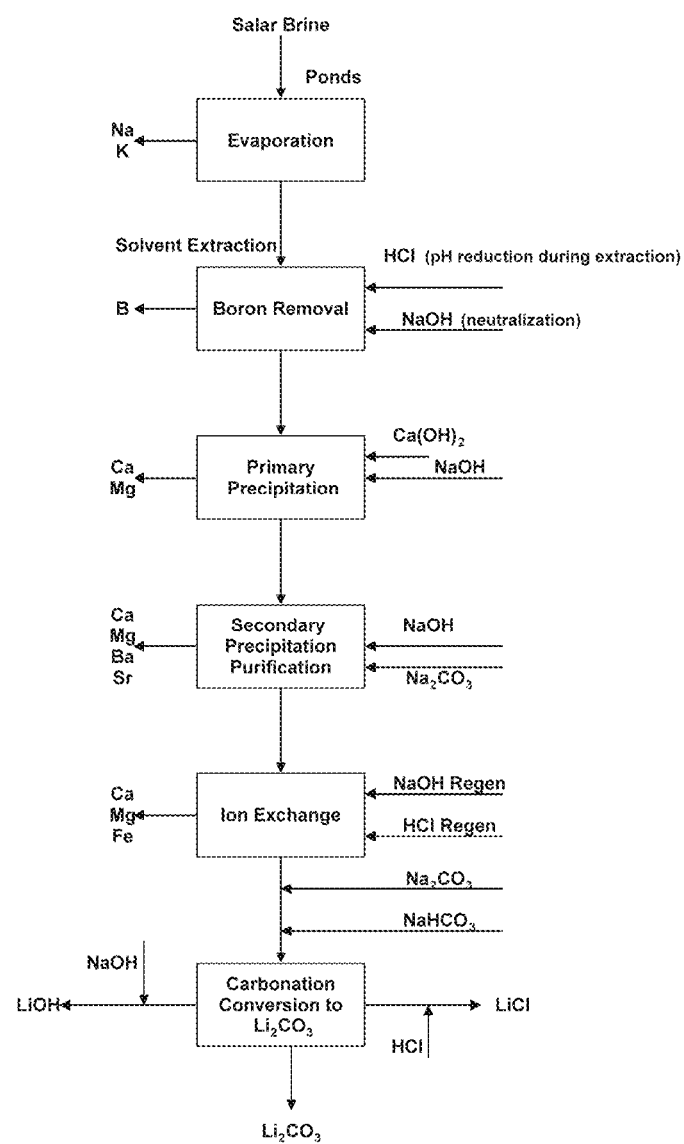
FIG. 1 shows an exemplary process flow diagram of a Li recovery from brine operation.

Although the invention is illustrated and described herein with reference to specific embodiments, the invention is not intended to be limited to the details shown. Rather, various modifications may be made in the details within the scope and range of equivalents of the claims and without departing from the invention.

The invention, according to one aspect, makes it possible to provide a unique gas diffusion electrode that can use ambient undried, humid air as a source of oxygen. This gas diffusion electrode, according to one embodiment, is used only at the cathode of the membrane electrolysis cells as disclosed herein.

According to additional aspects of this invention, the invention makes it possible to improve Li extraction from various sources, including brine sources or lithium ore sources where hydrochloric acid, sodium hydroxide, and/or sulfuric acid may be required; eliminate the need to outsource the acid and base feed materials by utilizing the already available brine onsite, whether derived from salar brine or a brine solution that is produced in the lithium ore refining process or a brine produced during a lithium ion battery recycling process; directly convert lithium containing salts, e.g. lithium chloride or lithium sulfate, to higher value lithium hydroxide product; provide a gas diffusion electrode configured for use in a membrane electrolysis cell and a method of producing the gas diffusion electrode; provide a membrane electrolysis cell for processing a salt-containing solution; and/or provide a process for purifying or concentrating or producing LiOH using a membrane electrolysis cell.

As used herein the term, "hydrophobic" means lacking an affinity for, repelling, or failing to adsorb or absorb water. In particular, a hydrophobic substance is one which has a contact angle greater than 90° when a droplet of water is placed on it.

As used herein the term, "hydrophilic" means having an affinity for and being capable of adsorbing or absorbing water. In particular, a hydrophilic material is one where the contact angle between a droplet of water and the material is less than 90°.

As used herein, the terms "oxygen depolarized cathode" or "ODC," and "gas diffusion cathode" or "GDC," may be used interchangeably and/or refer to the same structure, which is used for example, as the cathode in a membrane electrolysis cell.

Lithium Extraction from Brines

An increasing demand for the lithium requires matching production levels. In its free metallic form, lithium is extremely reactive. Hence, it is usually found in the form of mineral compounds comprising about 0.007% of the earth's crust as the primary source of lithium. Natural sources of lithium include igneous rocks, springs, sea and ocean water, as well as salar brines, which are underground reservoirs that contain high concentrations of dissolved salts, such as lithium, potassium, and sodium. These are generally found below the surface of dried lakebeds, known as salars.

Most lithium products are from brine sources, and most lithium is recovered from the salar brines or salt lake brines that occur in the Earth's crust and which contain lithium. The concentration of lithium in sea water is about 0.17 mg/L. Geothermal water and oil-well brines are also another source of recoverable lithium. Lithium salt-containing brines that may be produced during lithium ion battery recycling processes are also a source of recoverable lithium. Lithium recovery from these brines can be less expensive than mining the lithium from the mineral rocks.

While the following disclosure presents embodiments directed to recovering lithium from salar brines, or from lithium brines produced during processes to recover lithium from lithium ores, lithium salt solutions, also referred to herein as "brine," may also be sourced from lithium ion battery recycling processes.

The first attempt at commercial extraction of lithium from salt lake was reported in 1936 at the Searles Lake in the US. An ever-increasing growth in the extraction of lithium from the salt lakes has occurred since then. The brine concentration, pond accessibility and locality for solar evaporation, ratio of alkaline earth and alkali metal to lithium and the complexity of the chemistry are important factors when considering a brine as a Li recovery source.

The recovery of lithium from brine on an industrial scale can commence with a series of multiple stages of continuous solar pond evaporation of water from the brine. The lithium concentration of major brine extraction operations in the world ranges from 0.06 to 0.15 wt. % of the element lithium. This concentration reaches about 6 wt. % at the end of the evaporation cycle when it is ready for lithium carbonate ($Li_2CO_3$) production, or the production of LiOH as the desired end product. During the evaporation stage, salts with a lower solubility limit than the lithium salts precipitate out of the brine. Halite salts such as (NaCl) is the first to precipitate followed by sylvite (KCl), sylvanite (NaCl·KCl) and other salts. KCl is the main by-product in most brine recovery operations.

Some salar brines which contain higher Mg, Ca, and B content, require additional processing steps to remove these elements. Magnesium and calcium are preferably removed in order for the final product to be utilized in battery applications. Boron contamination is also harmful to the quality of the end product and has to be removed during the extraction process to achieve LIB quality requirement. During the evaporation stage, some compounds of Mg such as carnallite ($KCl·MgCl_2·6H_2O$) and bischoffite ($MgCl_2·6H_2O$) precipitate at around 4.4 wt. % elemental Li concentration in the brine. After further evaporation to reach 5-6 wt. % Li, the co-precipitation of compounds such as lithium carnallite ($LiCl·MgCl_2·6H_2O$) along with lithium carbonate or lithium chloride results leaves the final product with Mg contamination. To obtain a pure lithium carbonate or chloride product, these contaminants are preferably removed.

The removal process of Ca, Mg and B from the brine involves solvent extraction and precipitation stages. For example, boron can be removed by a solvent extraction process or the precipitation of boric acid. In the solvent extraction method, extractants such as high aliphatic alcohols or other organic solvents are used in an acidic environment to remove boron from the brine. Under acidic conditions, boron compounds form boric acid which precipitates out of the brine.

Numerous systems have been reported on development of boron removal process from lithium-containing brine. For instance, U.S. Pat. No. 3,855,392 describes the use of high aliphatic alcohol for extraction of boron from magnesium brine. Similarly, U.S. Pat. No. 4,980,136 describes the use of high aliphatic alcohol with 6 to 16 carbon atoms dissolved in kerosene at pH levels of 1 to 2 for extracting the boron from brine. U.S. Pat. Nos. 3,424,563; 5,939,038 describe the use of diols which are organic molecules containing two OH groups in their structures as extractants for boron removal. U.S. Pat. No. 4,261,960 discloses a boron, magnesium and calcium removal process involving the use of slaked lime ($Ca(OH)_2$) and calcium chloride solution to precipitate calcium borate hydrate as well as magnesium hydroxide and calcium sulfate dihydrate from the brine.

Magnesium and calcium can be removed from the brine through several precipitation processes. Converting the dissolved magnesium salt into magnesium hydroxide removes magnesium from the brine. Calcium hydroxide, lime (CaO) or slaked lime ($Ca(OH)_2$) is added to the brine to increase the pH and form $Mg(OH)_2$ which has limited solubility in water. During this process, sulfate ions also precipitate in the form of $CaSO_4$ and boron precipitates in the form of calcium borate hydrate. The precipitation of $Mg(OH)_2$ is also beneficial in further removal of boron though surface adsorption mechanism.

The adjustment of pH can be effected through different mediums. U.S. Pat. Nos. 4,036,713 and 4,207,297, disclose using the lithium hydroxide product form the recovery product to raise the pH of the initial brine and thereby precipitating the magnesium hydroxide. These patents also disclose the use of other basic solutions including sodium hydroxide or calcium hydroxide. U.S. Pat. No. 6,143,260 discloses the use of limed mother liquor from a previous lithium precipitation stage to remove Mg by precipitating the $Mg(OH)_2$. U.S. Pat. No. 6,048,507 discloses a bicarbonation process comprising mixing the impure lithium carbonate brine with $CO_2$ gas under pressure to precipitate unwanted species of iron, magnesium and calcium. Further removal of Fe, Mg and Ca ions is carried out by selective ion exchange process.

U.S. Pat. No. 5,993,759 describes a multistage process for purifying the lithium carbonate brine of high Mg content using soda ash, slaked lime and organic extractant. The process starts with an acidification step using hydrochloric acid (HCl) to maintain a pH level of 0 to 4 in order to produce boric acid ($H_3BO_3$) and which is removed through crystallization. The resulting boron-depleted brine is further purified using organic solvent extractant to achieve boron-free brine. The resulting brine diluted by a mother liquor is then treated by addition of sodium carbonate (soda ash) yielding magnesium carbonate as the solid precipitate. The rest of magnesium in the brine is further precipitated using calcium hydroxide and so forms $Mg(OH)_2$. During this stage, any calcium introduced to the brine also precipitates in the form of calcium carbonate due to the presence of sodium carbonate in the brine. The addition of soda ash at the last step results in the precipitation of lithium carbonate.

U.S. Pat. No. 8,691,169 discloses that the sequence of adding these compounds to the brine plays an important role in producing high purity lithium carbonate. The disclosure shows that the addition of calcium hydroxide before the brine removal step can remove all soluble magnesium as well as some boron and surface ions in the post-evaporation brine. The rest of boron in the brine is removed via solvent extraction. The resulting magnesium and boron-free brine is then carbonized by soda ash to obtain high purity lithium carbonate precipitates. The obtained $Li_2CO_3$ was further purified by adding carbonic acid, forming lithium bicarbonate and then precipitation of pure lithium carbonate is effected by heating the bicarbonate-containing brine. The last stage is disclosed to remove all sodium and calcium impurities from the final precipitate product.

The final lithium product is produced from the resulting brine from which most of Mg, B, Ca, and other species have been removed. Soda ash (sodium carbonate, i.e. $Na_2CO_3$) is a reagent for converting the solute Li ions into $Li_2CO_3$ precipitate. This precipitate can be used in technical or high purity grade. Depending on the nature of the process, the initial composition of the brine and the customer demand, the Li recovery process can be designed and modified. For technical grade lithium carbonate, the common recovery process of pond evaporation and concentration, selective removal of contaminants and carbonation is sufficient.

For high purity and battery grade product, several extra processing stages have been proposed. For instance, U.S. Pat. No. 9,169,125 B2 discloses the use of spray drying, washing and carbonation after the contaminant removal to obtain purified lithium carbonate product. Bicarbonation of the lithium carbonate can be used for purifying the final product.

U.S. Pat. No. 8,691,169 B2 discloses the use of carbonic acid to form lithium bicarbonate from the lithium carbonate. The resulting bicarbonate is then decomposed to purified carbonate upon exposure to heat at 50 to 95° C. Another method for further purification of the brine prior to lithium carbonate precipitation is the implementation of ion exchange resins. Lithium carbonate products with purity as high as 99.9% can be achieved by using this method in the process.

WO Pat. Appln. Publ. No. 2013/036983 discloses the use of ion exchange resins throughout the recovery process. Also disclosed therein is an ion exchange resin for boron removal, which replaces the solvent extraction method. An ion exchange resin to remove the trace soluble divalent and trivalent species containing Mg, Ca and Fe from the brine during the final stages of the recovery is also disclosed. U.S. Pat. No. 8,641,992 discloses ion exchange resin by which Mg ions are selectively removed from the brine.

Generally, a process for the recovery of lithium from brine can be illustrated as shown in FIG. 1. The first stage of recovery consists of multiple pond evaporative concentration steps that remove high levels of sodium and potassium salts for instance, NaCl and KCl and possibly others by precipitation, since these are less soluble than the desired lithium salts. The evaporation thus increases the lithium concentration in the brine. Some of the magnesium in the form of precipitated $MgCl_2$ is also removed during this evaporative stage. Next stages involve the removal of boron, calcium, magnesium as the main sources of impurity in the brine. Removal of the B, Ca and Mg ions is carried out using repeated pH adjustment, solvent extraction and precipitation steps to ensure maximum ion removal. Ion exchange removal of leftover trace monovalent, divalent and trivalent ionic species other than the lithium further purifies the brine. Introduction of soda ash, $Na_2CO_3$, to convert the dissolved lithium salts to lithium carbonate, $Li_2CO_3$, is the last major step to produce technical and high purity lithium carbonate.

As expected, almost every brine recovery operation, no matter the source of the brine heavily relies on the use of reagents throughout the process stages. Generally, more than 50% of the overall operating costs in lithium production usually stems from the cost of these reagents. The major reagents contributing to the recovery cost are soda ash ($Na_2CO_3$), lime (primarily $CaCO_3$) and slaked lime ($Ca(OH)_2$), caustic soda (NaOH), hydrochloric acid (HCl), extractants such as high aliphatic alcohols or other organic solvents, and sulfuric acid ($H_2SO_4$).

Soda ash or sodium carbonate ($Na_2CO_3$) is the major component of a lithium recovery process due to its importance for various lithium recovery stages. It is used to remove calcium from the brine through precipitation of $CaCO_3$. It is also the sole reagent used for producing lithium carbonate.

Slaked lime or calcium hydroxide ($Ca(OH)_2$) produced from heating and then hydrating the lime (primarily $CaCO_3$), can be used for the removal of magnesium and some sulfate ions. Different grades of lime could be used based in the use of lime in the initial evaporation pond or the lithium carbonate processing plant. For instance, the removal of magnesium chloride and sulfate and other sulfate ions from the brine using the slaked lime occurs according to the following reactions:

$$MgCl_2(aq.)+Ca(OH)_2(aq.)\Leftrightarrow Mg(OH)_2(s)+CaCl_2(aq.) \qquad 1)$$

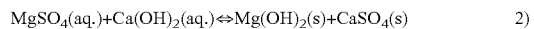

$$MgSO_4(aq.)+Ca(OH)_2(aq.)\Leftrightarrow Mg(OH)_2(s)+CaSO_4(s) \qquad 2)$$

$$Na_2SO_4(aq.)+Ca(OH)_2(aq.)\Leftrightarrow CaSO_4(s)+NaOH(aq.) \qquad 3)$$

Caustic soda or sodium hydroxide (NaOH) is another chemical reagent that can be used in different stages of the processing plant. It can be used as the stripping agent to regenerate the solvent after the boron removal using the organic solvent extraction. It is also the most suitable alkali metal hydroxide for the removal of magnesium because it produces very high purity $Mg(OH)_2$ as a by-product. Another important use of the NaOH is during the water treatment process for pH adjustment, as well as for ion exchange resin regeneration.

Similar to caustic, hydrochloric acid (HCl) can be used as a reagent in a variety of the process steps throughout the recovery process. It can be used as a pH modifier during the boron solvent extraction step since the initial stage of solvent extraction normally requires an acidic environment. Another use of hydrochloric acid is in the concentration ponds (also called evaporation ponds) where adding it prevents the unwanted precipitation of lithium carbonate. HCl is also the main reagent for transformation of lithium carbonate into lithium chloride when needed. Hydrochloric acid is also used to regenerate the acid exchange resins which are used for selective ion removal from brine. Sulfuric acid ($H_2SO_4$) can be stored in the concentrated 98% form and can be used for de-scaling and cleaning of the lithium carbonate processing plant.

The major constituents of the reagent costs are soda ash, contributing to almost 50%, lime with around 15%, caustic soda (NaOH) with about 7% and hydrochloric acid with 1% of the total reagents costs. In some cases where the ratio of Mg:Li is high, this contribution of the soda ash can be as much as 80% of the total reagent costs. The on-site production of these chemicals can be very beneficial toward reducing operating costs.

Disclosed herein, as an aspect of this invention, is an electrodialysis multi-compartment system which allows for the on-site production of caustic soda (NaOH) and hydrochloric acid (HCL) from the existing brine in the evaporation ponds. The caustic soda is then transformed into sodium carbonate (soda ash) and sodium bicarbonate ($NaHCO_3$) using the readily available carbon dioxide ($CO_2$) that is used on-site. The system is fully controllable and allows for the desired concentration of product. The capability to tune the concentration of NaOH and HCl mitigates the operating costs associated with shipping and storing concentrated solutions.

Lithium Extraction from Rock Mining

Several minerals contain Li in their structure. For example, at least four minerals have found interest as viable Li sources. These are Lepidolite $(K(Li,Al,Rb)_2(Al,Si)_4O_{10}(F,OH)_2)$, Spodumene $(LiAl(SiO_3)_2)$, Petalite $(LiAlSi_4O_{10})$, and Amblygonite $((Li,Na)AlPO_4(F,OH))$. Among these, Spodumene is usually the most important ore for commercial Li production. (Helvaci, C., 2003. Presence and distribution of lithium in borate deposits and some recent lake waters of West-Central Turkey. Int. Geol. Rev. 45 (2), 1-14.). Expected growth in demand over the coming century for lithium batteries used in power hybrid and fully electric automobiles has raised interest in lithium production (Tahil, 2007, 2008; Bradbury, 2008).

Various methods have been developed to obtain lithium from lithium ores (Victor, K. A., 1953. Method of recovering lithium compounds from lithium minerals. U.S. Pat. No. 2,793,933; Walter, R., Bichowsky, Francis R., 1935. Method of recovering lithium from its ores. U.S. Pat. No. 2,020,854.; Robinson, G. P., 1961. Recovery of lithium from ore. U.S. Pat. No. 2,983,576; Moon, K. S., Fuerstenau, D. W., 2003. Surface crystal chemistry in selective flotation of spodumene $(LiAl[SiO_3]_2)$ from other aluminosilicates. Int. J. Miner. Process. 72 (1-4), 11-24; Saeki, S., Lee, J., Zhang, Q., Saito, F., 2004. Co-grinding $LiCoO_2$ with PVC and water leaching of metal chlorides formed in ground product. Int. J. Miner. Process. 74 (Supplement 1), 5373-5378; Büyükburc, A., Maras, I., Ioglu, D., Bilici, M. S. U., Köksal, G., 2006. Extraction of lithium from boron clays by using natural and waste materials and statistical modelling to achieve cost reduction. Miner. Eng. 19 (5), 515-517; Jandová, J., Dvorák, P., Vu, H. N., 2010. Processing of zinnwaldite waste to obtain $Li_2CO_3$. Hydrometallurgy 103 (1-4), 12-18; Brandt, F., Haus, R., 2010. New concepts for lithium minerals processing. Miner. Eng. 23 (8), 659-661; Chen, Y., Tian, Q., Chen, B., Shi, X., Liao, T., 2011. Preparation of lithium carbonate from spodumene by a sodium carbonate autoclave process. Hydrometallurgy 109 (1-2), 43-46). Lithium can be extracted from lepidolite using the sulfate acid and the lime methods (Distin, P. A., Phillips, C. V., 1982. The acid extraction of lithium from the granites of South West England. Hydrometallurgy 9 (1), 1-14). However, the extraction of lithium by the sulfate acid method often uses high concentration acid and the purification procedure can be complex. The lime process uses limestone and can require a large amount of energy.

Wadman and von Girsewalt (Ellestad, Reuben B., Clarke, Fremont F., 1955. Extraction of lithium from its ores. Min. Eng. 7, 1045) ground lithium silicate ore (Lepidolite $(K(Li,Al,Rb)_2(Al,Si)_4O_{10}(F,OH)_2)$, Spodumene $(LiAl(SiO_3)_2))$ with an excess of alkali sulfate (usually $K_2SO_4$) in at least a 1 to 1 proportion and heated the mixture to a relatively high temperature. At elevated temperature ion exchange occurred forming lithium sulfate which, together with the excess potassium sulfate, was dissolved by leaching with water. Successful operation of this process required thorough mixing and careful temperature control. In addition, high consumption of $K_2SO_4$ may add cost. A mixture of alkali sulfates and alkali oxide was used as reactant and the results demonstrated that an advantageous effect was obtained when the lepidolite was roasted with a mixture of $Na_2SO_4$, $K_2SO_4$ and CaO.

Figure 2:
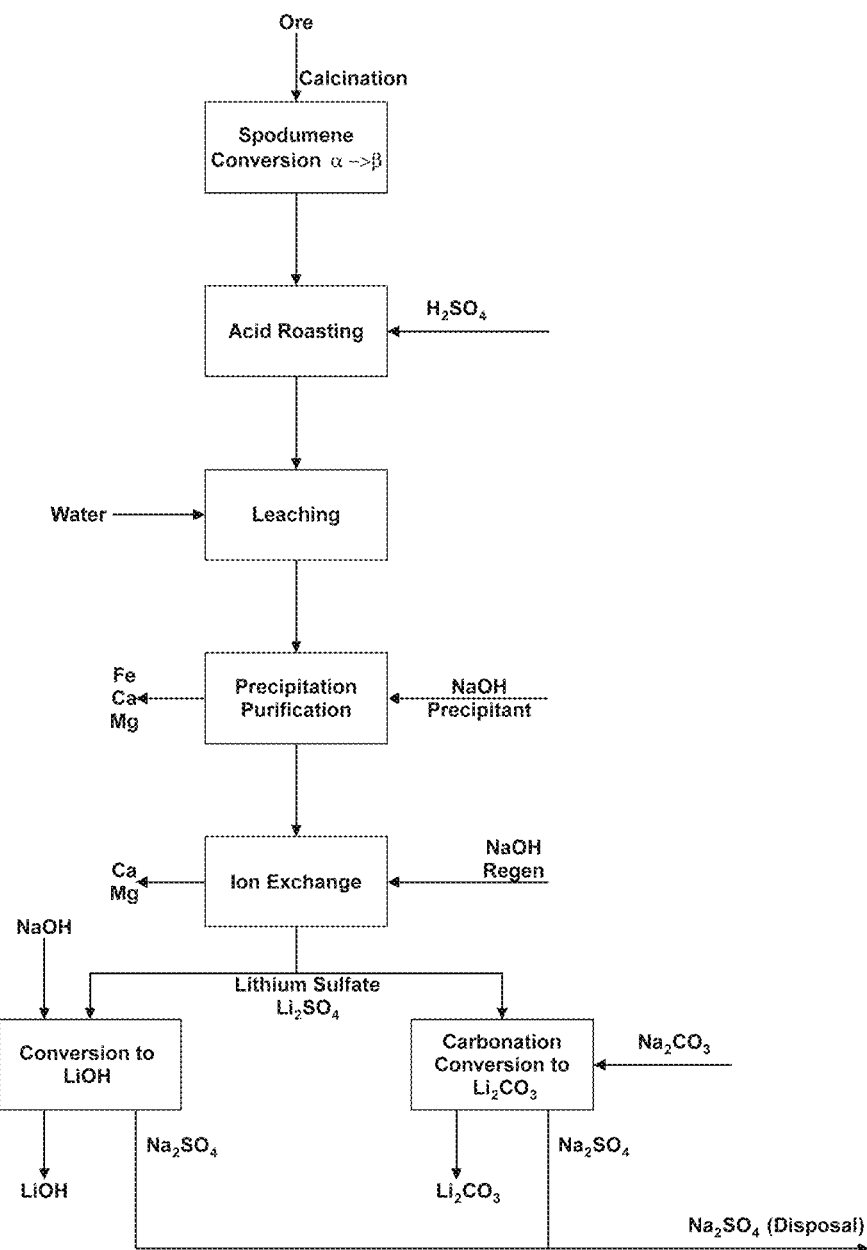
FIG. 2 shows an exemplary process flow diagram of a Li recovery from rock mining operation.

In order to process spodumene as described in U.S. Pat. No. 2,516,109, α-spodumene raw material is first converted to β-phase by roasting at 1100-1300° C. A typical lithium extraction from spodumene mineral is shown in FIG. 2. Tahil (Tahil, W., 2010. How much lithium does a Li ion EV battery really need? Meridian Int. Res., (Mar. 5, 2010).) reported the roasting of spodumene in a kiln at ~100° C. The calcine was mixed with sulfuric acid and roasted at 250° C. and subsequently leached in water to yield an aqueous solution of lithium sulfate. Reaction of β-spodumene with $H_2SO_4$ is shown as reaction 4). (Mcketta, J. J., 1988. Lithium and lithium compounds. Encyclopedia of Chemical Processing and Design vol. 28. Marcel Dekker)

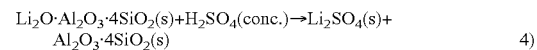

$$Li_2O \cdot Al_2O_3 \cdot 4SiO_2(s) + H_2SO_4(conc.) \rightarrow Li_2SO_4(s) + Al_2O_3 \cdot 4SiO_2(s) \quad \quad 4)$$

Lithium carbonate can be recovered by the addition of sodium carbonate to the solution after pH adjustment, purification and evaporation, shown in reaction 5.

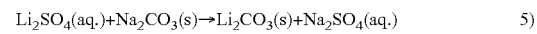

$$Li_2SO_4(aq.) + Na_2CO_3(s) \rightarrow Li_2CO_3(s) + Na_2SO_4(aq.) \quad \quad 5)$$

The world's first continuous plant to convert spodumene concentrate to lithium carbonate by calcination, roasting of calcine with $H_2SO_4$ and subsequent water leaching, was commissioned in 2012 by Galaxy Resources in China (Clarke, G. M., 2013. Lithium-ion batteries: raw material considerations. Am. Inst. Chem. Eng. 44-52). One of the drawbacks of the sulfuric acid method to treat lepidolite, petalite and zinnwaldite is the requirement of a high concentration of acid and complex purification processes, whereas spodumene needs to be converted to the more leachable β-phase at higher temperature.

Overall, the cost of reagents during the rock mining process also contributes to 45% of the overall operation costs. Implementing methods to reduce such costs is the next big step in lithium recovery process. Due to the intense use of chemical reagents during these processes, the most logical approach is to recycle them after the process. Electrochemical techniques provide flexible solutions for recycling chemicals.

Electrochemical Processes for Onsite Reagent Recovery

The use of membrane electrolysis cells (also referred to as electrodialysis cells) have been successfully implemented as described herein to generate chemicals from a brackish water or brine stream. The process involves the use of a series of ion exchange membranes stacked in an order specific to the components of the brine stream being processed as well as the desired outputs. The membranes are designed to allow specific charged ionic species permeate through. Cation exchange membranes transfer cationic species while anion exchange membrane only allow anions transport through the membrane structure. Bipolar membranes are another type which split water molecules into the H+ and OH− components. The movement of ions is enabled by applying an external voltage using a cathode and anode electrode. Under applied voltage, anions travels toward the positively charged anode while cations travel towards the negatively charged cathode. Through careful placement of membranes, desired chemicals such acids, bases, and salts can be produced. During an electrolytic process with aqueous catholyte and anolyte, gaseous species such as $H_2$ and $O_2$ may be generated on the electrodes, due to the electrolysis of water.

Electrochemical desalination techniques rely on the above-mentioned principles of membrane electrolysis. A stream of concentrated brine or salt passes through the separation device. An electrical current (DC) applied between anode and cathode generates ionic species. The anions from the input salt solution migrate through anion exchange membrane(s) and combine with H+ ions generated on the anode and produce acid. Cations from the input salt solution likewise migrate through cation exchange membrane(s) and combine with OH– ions generated on the cathode and produce base.

An example of salt splitting process is disclosed in U.S. Pat. No. 2,829,095, where a combination of anion and cation exchange membrane was used to dissociate NaCl salt into Na+ and Cl– ions. Sodium ions were then combined with OH– from the cathode and produced NaOH. On the other hand, chloride ions combined with H+ generated on the anode and produce HCl. The overall voltage required to achieve the splitting include the potential for water decomposition and potential drop across the membranes and electrolyte solutions.

Another example of this process is the conversion of brine (NaCl) into NaOH and chlorine gas during the chlor-alkali process described in U.S. Pat. No. 4,217,186. During this process, the NaCl brine is fed into the anolyte compartment while water (or NaOH) is fed into the catholyte compartment. Upon the application of voltage, sodium ions migrate through a cation exchange membrane toward the cathode where they combine with OH– ions produced by the electrolytic splitting of water on the cathode which forms NaOH. Chlorine gas is evolved in the anode compartment according to reaction 6) while hydrogen gas is produced on the cathode.

$$4Cl^- \rightarrow 2Cl_2 + 4e^- - E^0 = 1.36V \quad (6)$$

The chlor-alkali process can be modified to reduce the overall cell voltage and thereby reduce energy consumption. With the purpose of eliminating the $H_2$ generation on the cathode and reducing overall cell energy consumption, an oxygen depolarized cathode (ODC) has shown reduction in the required cell voltage in the chlor-alkali process. An example of such an application is disclosed in U.S. Pat. No. 4,191,618. The depolarization of the cathode by oxygen gas results in the formation of only hydroxyl ions thereby preventing the formation of hydrogen gas. In a hydrogen evolving scenario, the cathodic reaction in the chlor-alkali process is as follows:

$$4H_2O + 4e^- \rightarrow 2H_2 + 4OH^- - E^0 = -0.83V \quad (7)$$

Using the oxygen depolarized cathode, where $O_2$ gas is applied to the cathode, the cathodic reaction changes to a hydroxyl formation reaction according to the reaction:

$$2H_2O + O_2 + 4e^- \rightarrow 4OH^- - E^0 = 0.401V \quad (8)$$

Overall, the use of ODC and the application of pure oxygen at the cathode in the chlor-alkali process means that the overall cell voltage is approximately 1V less out of 3.3V in chlor-alkali cell. In most cases of ODCs, pure $O_2$ is required to operate the cell.

As will be described in detail below, the novel gas diffusion electrode disclosed herein, permits the operation of a five-compartment membrane electrolysis cell with an air stream, rather than pure oxygen applied at the cathode. In the instant case, the anode reaction is not the chlorine evolution because there is no chloride solution there. Instead oxygen is evolved in the water oxidation reaction:

$$2H_2O(l) \rightarrow O_2(g) + 4H^+(aq.) + 4e^- \quad (9)$$

WIPO Pat. Appln. Publ. No. WO 2015/149185 A1 describes a membrane electrolysis cell assembled using a combination of anion and cation exchange membranes. The cell was utilized to convert carbon dioxide gas and a saline brine stream into carbonate salt, hydrochloric acid and desalinated water.

The present disclosure is related to the in situ process of generating reagent chemicals useful during the regular lithium extraction processes from salar brines or other lithium-containing brines such as those arising from lithium ion battery recycling operations, and from rock minerals. The process describes an electrochemical method for converting waste chemical streams into valuable reagent chemicals required during the lithium extraction operation. The disclosed electrochemical method involves a multi-compartment membrane electrolysis cell which may be incorporated into current lithium extraction processes from salar brine and from lithium-containing ore without disturbing the process flow of either type of recovery process. The disclosed process is unique in that it allows the attachment of the unique membrane electrolysis cell feed and product streams onto the commonly practiced lithium extraction processes, as well as the particular design of the gas diffusion electrode (GDE) which is used as the cathode and optionally may also be used as the anode of the cell.

In the following description of the embodiments of the invention, the membrane electrolysis cell will be described, and then the details of the gas diffusion electrode that is used as the oxygen depolarized cathode will be discussed in detail. Finally, particular uses of the membrane electrolysis cell that comprises the GDE as the cathode in the production of lithium will be described.

Membrane Electrolysis Cell

Figure 3:
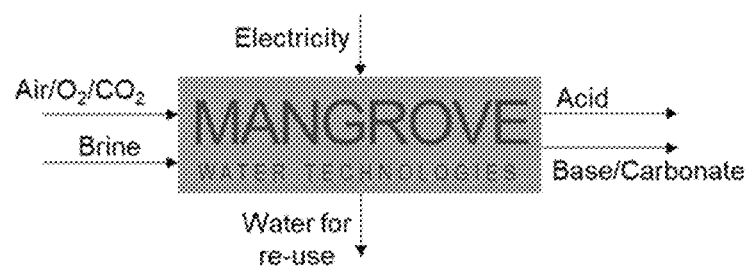
FIG. 3 is a schematic diagram illustrating an exemplary membrane electrolysis cell showing feed and product streams.

A schematic diagram of feed and product streams for a generalized inventive membrane electrolysis cell is illustrated in FIG. 3.

A solution being treated, also referred to herein as the brine feed, is fed into the depletion (also referred to as the salt depletion chamber or compartment) chamber and cations and anions migrate from the solution in the depletion chamber to adjacent product chambers (which may be referred to herein also as acid build up compartment or base build up compartment), thereby reducing the ion concentration of the solution. The solution may be any saltwater solution such as brine, seawater or wastewater, or any solution being treated to reduce the concentration of ions therein, for example industrial waste solutions from oil and gas, mining, forestry, lithium ion battery recycling processes, etc. Any type of aqueous or non-aqueous stream consisting of ions or non-ionic species that could be made into ions by the addition of other chemicals or by processing could potentially be utilized as the brine feed.

As alluded to above, in electrodialysis, an electric potential gradient may be generated between an anode and cathode. In an aqueous setting, the anode and the cathode generally undergo the following half-cell reactions respectively:

$$H_2O(l) \rightarrow 2H^+(aq.) + \tfrac{1}{2}O_2(g) + 2e^- \text{ (anodic reaction)} \quad (10)$$

$$2H^+(aq.) + 2e^- \rightarrow H_2(g) \text{ (cathodic reaction)} \quad (11)$$

The dialysis cell, also referred to as the membrane electrolysis cell of the disclosed embodiments includes a plurality of compartments, creating a "stack" of compartments, and the walls of the compartments comprise ion exchange barriers separating the chambers. Ion exchange barriers (also referred to herein as membranes) in the membrane electrolysis cell generally do not require regeneration, thereby reducing the need for chemical inputs over ion exchange processes. Inorganic scaling of ion exchange barriers and ion exchange barrier fouling can be managed through polarity reversal, periodic flushes and/or acid washes, as necessary.

The ion exchange barriers of the membrane electrolysis cell include cation exchange barriers which selectively allow migration of cations, and anion exchange barriers which selectively allow migration of anions. The ion exchange barriers may be water permeable. The ion exchange barriers may be ion exchange membranes and may include, but are not limited to, commercially available bi-polar membranes and membranes with chemical modifications. Non-limiting examples of such modifications are: (i) perfluorinated films with fixed pyridine or sulfonic groups; (ii) polyetherketones; (iii) polysulfonones; (iv) polyphenylene oxides; (v) polystyrene; (vi) styrene-divinyl benzene; (vii) polystyrene/acrylic based fabrics with sulfonate and quaternary ammonium cations; (viii) polyfluorinated sulfuric acid polymers; or (ix) resin-polyvinylidenedifluoride fabrics. In alternative embodiments, other ion exchange barriers such as are known in the art may be utilized.

The membrane electrolysis cells (also referred to as electrodialysis cells) of the described embodiments generally include a cathode and anode, which may be constructed of conductive porous or non-porous substrates, and coated with a catalyst or catalysts. The ion exchange barrier (such as an ion exchange membrane) may alternatively or additionally be coated with a catalyst or catalyst. These catalysts may enhance the rate of reactions in the electrolysis cell. Suitable catalysts include, but are not limited to, precious or non-precious transition metals and their compounds (e.g. oxides, nitrides, etc.). The catalysts could be supported onto for example metal, metal oxides, metal nitrides, etc. or unsupported. A mixture of one or more catalysts, optional binder and other optional additives (for example hydrophilic and/or hydrophobic additives to control liquid and gas bubble removal), may be applied to the either or both of the cathode and anode electrodes and/or ion exchange barrier by a variety of techniques known in the art, such as spraying, sputtering, screen printing and the like. Fluids can flow in the cell via flow fields (open channels like serpentine, inter-digitated, etc.), porous closed channels, or open pocket. The cell could be operated under pressure or pressure differentials.

In operation, an electric potential may be applied between the cathode and anode to facilitate the occurrence of electrochemical reactions at the electrodes and migration of ions across the ion exchange membranes. In a membrane electrolysis cell (also referred to as a dialysis cell), an electric potential may be applied between conductors to create an electric field to enhance migration of ions across the ion exchange membranes and chambers without any electrochemical reactions occurring. However, the application of an electric potential between the conductors is not necessary for operation as ions may diffuse through the ion exchange membranes under the influence of other transport mechanisms such as a concentration gradient.

In the described embodiments of the membrane electrolysis cell, solutions may be conveyed into and away from chambers of the membrane electrolysis cell using a manifolding assembly which may include conduits, optional valves and other equipment known in the art to convey solutions to and away from chambers of a membrane electrolysis cell.

As the FIG. 3 schematic shows, a feed brine stream is supplied to the cell. Other inputs include air and/or oxygen and/or carbon dioxide and/or hydrogen gas or a mixture of these as well as electrical power. The product streams may include the desalinated water, acid, base and/or carbonate salts. The acid materials may be hydrochloric acid (HCl) or sulfuric acid ($H_2SO_4$) depending on the composition of the feed brine. The base product may be sodium hydroxide (NaOH), potassium hydroxide (KOH) or lithium hydroxide (LiOH) or a mixture, depending on the nature of the feed brine. Carbonate and bicarbonate salts may also be produced upon the addition of carbon dioxide to the gas feed stream. These salts may also be produced separately by sparging carbon dioxide into the sodium hydroxide product in a later stage.

Figure 4:
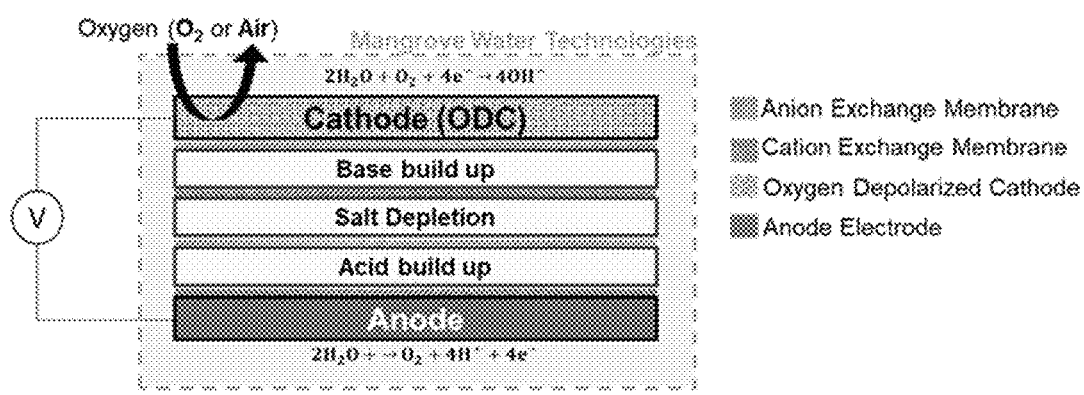
FIG. 4 shows the structure of the electrodes and membrane assembly inside a first embodiment of a membrane electrolysis cell.

A first embodiment membrane electrolysis single cell consists of five compartments as depicted in FIG. 4. The cell contains an oxygen depolarized cathode (ODC) (described in more detail later) in a cathode compartment, a dimensionally stable anode (DSA) in an anode compartment, as well as two anion and two cation exchange membranes stacked in alternating fashion, so as to define the compartments of the cell.

The electrochemical processes involved in the first membrane electrolysis cell are cathodic reaction on an ODC, anodic reaction on a DSA, acid formation in the acid build up compartment, base formation in the base build up compartment and salt splitting in the salt depletion compartment. The use of a first anion exchange membrane near the cathode compartment allows for transport of the hydroxyl ions generated by the cathode into the base compartment. Another important use of this membrane is to avoid the flooding of gas diffusion electrode cathode (i.e., the ODC) in contact with the base solution. A first cation exchange membrane between the salt depletion compartment and the base build up compartment enables the transport of salt cations (Na+ in the case of NaCl or $Na_2SO_4$ as the feed brine or Li in the case of LiCl or $Li_2SO_4$) from the salt depletion compartment into the base build up compartment. The combination of sodium ions with hydroxyl ions results in the formation of sodium hydroxide in the base build up compartment. The anodic reaction results in generation of protons (H+) which are then transported through a second cation exchange membrane into the acid build up compartment. The protons then combine with anions transported through a second anion exchange membrane from the salt depletion compartment to form acid. Depending on the nature of salt, anions (Cl– in the case of NaCl and $SO_4^{2-}$ (sulfate) in the case of $Na_2SO_4$), hydrochloric acid (HCl) or sulfuric ($H_2SO_4$) acid is formed. Further, if LiCl is fed to the salt depletion compartment, HCl will build up in the acid build up compartment and LiOH will be formed in the base build up compartment. Finally, if $Li_2SO_4$ is utilized as the brine feed stream, sulfuric ($H_2SO_4$) acid and LiOH will be formed in the acid build up compartment and the base build up compartment, respectively.

Figure 5:
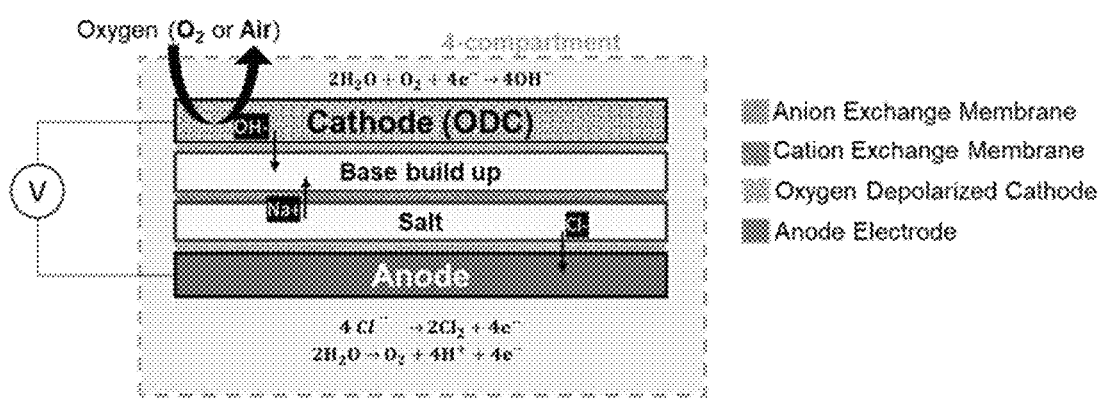
FIG. 5 shows the structure of the electrodes and membrane assembly inside a second embodiment of a membrane electrolysis cell.

A second embodiment of the membrane electrolysis cell is shown in FIG. 5. In this second embodiment, the membrane electrolysis cell comprises four compartments. In this embodiment, the cathode, which is an oxygen depolarized cathode, like the first embodiment, is housed in a cathode compartment, which is defined by a first anion exchange membrane. The cathode compartment is in fluid communication with a base build up compartment via the first anion exchange membrane. The base build up compartment defined by the first anion exchange membrane and a cation exchange membrane. As can be seen in FIG. 5, the base chamber thus in fluid communication with a salt compartment, which may also be referred to as the salt depletion compartment, via the cation exchange membrane. The second anion exchange membrane defines an anode compartment, which houses the anode. The anode therefore is in fluid communication with the salt chamber via the second anion exchange membrane.

In the membrane electrolysis cell second embodiment shown in FIG. 5, an exemplary feed brine comprising aqueous NaCl may be fed to the salt (or salt depletion) compartment. Oxygen, which may be in the form of air, and preferably is humidified air, produced by bubbling the air stream through water is fed to the oxygen depolarized cathode. The oxygen depolarized cathode may be a bilayer gas diffusion electrode (described in detail below). When a voltage is applied across the anode and cathode, the positive Na+ migrate towards the negatively charged cathode compartment through the cation exchange membrane and remain in the base build up compartment, since they cannot pass through the first anion exchange membrane. Likewise, the OH− anions produced at the ODC build up in the base build up chamber since they will migrate away from the negatively charged cathode through the anion exchange membrane and towards the positively charged anode. Like the Na+ ions, the OH− ions remain in the base build up chamber because they cannot pass through the cation exchange membrane. Therefore, NaOH is formed in the base build up chamber. As shown in FIG. 5, the Cl− anions migrate away from the salt compartment to the anode via another anion exchange membrane. The Cl− anions combine at the anode to form $Cl_2$, i.e. chlorine gas. Note that because the membrane electrolysis cell is in an aqueous environment, some water oxidation reaction takes place at the anode compartment, since the anode compartment and the salt (also called salt depletion) compartments are separated by an anion exchange membrane.

Importantly, a person having skill in the art can appreciate that if LiCl in an aqueous solution is used as the brine feed stream rather than the exemplary NaCl, LiOH will be produced in the base build up compartment. In the case of LiCl, chlorine gas will still be produced at the anode. Analogous to the first embodiment membrane electrolysis cell, $Na_2SO_4$ or $Li_2SO_4$ can also be used as the brine feed streams in the second embodiment membrane electrolysis cell, and will therefore produce NaOH and LiOH, respectively in the base build up compartment and will produce $H_2SO_4$ at the anode.

Figure 6:
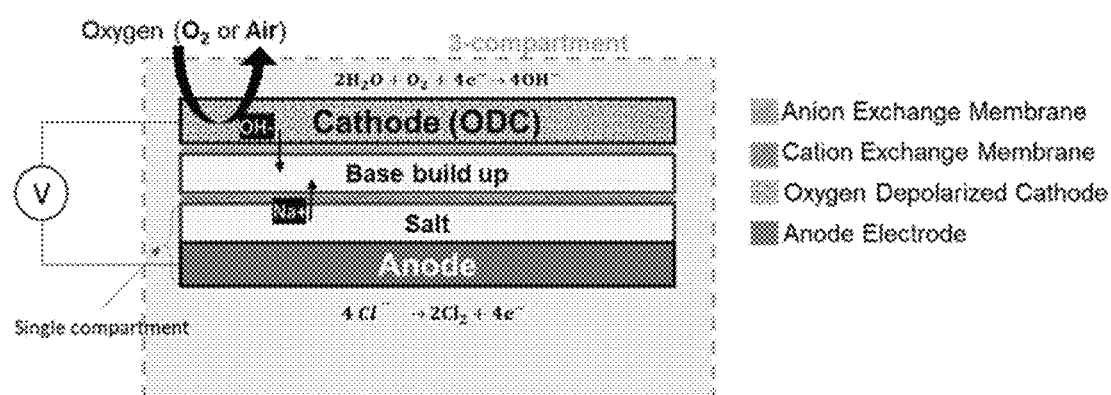
FIG. 6 shows the structure of the electrodes and membrane assembly inside a third embodiment of a membrane electrolysis cell.

A third embodiment membrane electrolysis cell is shown in FIG. 6 and comprises three compartments. As shown in the figure, the anode is housed in the salt depletion chamber; this third embodiment comprises two other compartments; a cathode chamber and a base build up chamber. Thus, the brine feed essentially is fed onto the anode. As in the first and second embodiments, the cathode comprises a bilayer oxygen depletion cathode, to which is fed oxygen, preferably in the form of air, and more preferably in the form of humidified air.

Therefore, as shown in FIG. 6, OH− ions are evolved at the cathode and they migrate away from the negatively charged cathode, through an anion exchange membrane which defines the cathode compartment and into the base build up compartment. For an exemplary feed brine of aqueous NaCl, as shown in FIG. 6, the Na+ ions formed in the anode/salt depletion compartment migrate away from the positively charged anode, through a cation exchange membrane, which defines the anode/salt depletion compartment, and into the base build up chamber. NaOH is therefore formed in the base build up chamber.

As shown in FIG. 6, chlorine gas is evolved at the anode, since Cl− anions are formed at the anode. Like the first and second embodiments of the membrane electrolysis cell, if the feed brine comprises an aqueous solution of LiCl, LiOH will form in the base build up compartment and $Cl_2$ will evolve at the anode. If aqueous $Na_2SO_4$ is the feed brine, NaOH will be formed in the base compartment and $H_2SO_4$ will form at the anode. Finally if aqueous $Li_2SO_4$ is the feed brine, LiOH will be formed in the base compartment and $H_2SO_4$ will form at the anode.

Figure 7:
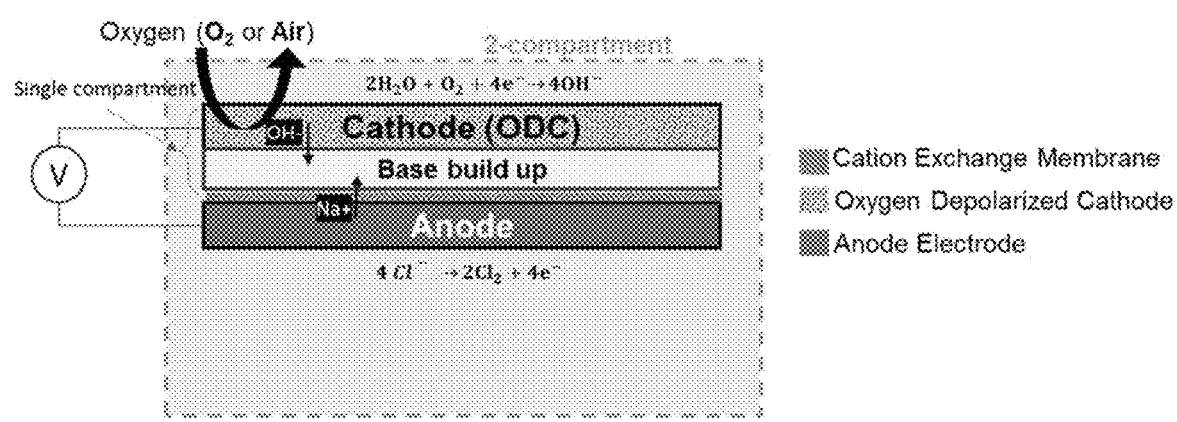
FIG. 7 shows the structure of the electrodes and membrane assembly inside a fourth embodiment of a membrane electrolysis cell.

A fourth embodiment membrane electrolysis cell is shown in FIG. 7. In this embodiment, there is a single ion exchange membrane which may be a cation exchange membrane. Like all of the other embodiments, the cathode is an ODC that uses $O_2$, but air may be used as a source of $O_2$. As in the previous embodiments, an aqueous NaCl solution is shown as an exemplary feed brine, but a person having skill in the art can comprehend that similar transport of the ions will occur as for NaCl, depending on the ionic species in the feed brine. In this fourth embodiment a brine feed comprising NaCl is fed to the anode compartment. The Na+ ions thus move through the cation exchange membrane into the cathode compartment. Since the cathode comprises an ODC, OH− ions are formed at the cathode and there base, i.e. NaOH is formed in the cathode compartment. In this embodiment, it is clear that the cathode compartment and the base compartment are the same. As shown in FIG. 4, the Cl− ions combine to form chlorine gas at the anode.

Any of the membrane electrolysis cells described herein may optionally incorporate any of the following of features:
  Flow fields to improve oxygen and water transport to and away from the membrane electrolysis cell;
  Designed ion exchange membrane properties and feedback loops can be incorporated to control the concentrations of the produced acid and base.

Gas Diffusion Electrodes

As mentioned briefly above, an important component of the membrane electrolysis cells disclosed herein is the unique gas diffusion electrode that is used as the oxygen depolarized cathode. This gas diffusion electrode allows the membrane electrolysis cell to operate using air as the oxygen source at the cathode. This is a significant economic and safety advance in the ability to incorporate these cells into lithium recovery processes.

Figure 8A:
FIG. 8A shows an exemplary single layer gas diffusion electrode (GDE)
Figure 8B:
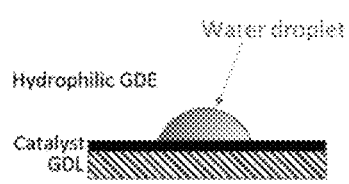
FIG. 8B shows details of the single layer gas diffusion electrode (GDE) of FIG. 8A.

A gas diffusion electrode is shown schematically in FIGS. 8A and 8B. Typically, in these gas diffusion electrodes that can be used as the oxygen depolarized cathode, a catalyst is deposited directly on the surface of the gas diffusion layer (GDL) as shown in FIG. 8A. Generally, the catalyst is either hydrophobic or hydrophilic. As shown in FIG. 8B, indicated by the spread-out water droplet on the catalyst surface, the catalyst is hydrophilic. It should be understood that in FIG. 8B as well as subsequent FIGS., that a water droplet, whether spread out to indicate a hydrophilic surface, or shown as sitting on top of the surface, to indicate that the surface is hydrophobic, do not indicate that water is actually residing on said surface. The water droplets are merely a convenient way to indicate whether the surface shown is hydrophilic or hydrophobic.

As shown in FIGS. 8A and 8B, in the single layer GDE or ODC, the layer comprises a catalyst on the gas diffusion layer, optionally with an anion exchange membrane disposed on the opposite side of the GDL (not shown) from the catalyst.

The implementation of the ODC in the membrane electrolysis cell requires significant changes to cell design. A porous gas diffusion electrode (GDE) is usually used as the cathode electrode. This is because of the requirement of a three-phase boundary where the three reactants (oxygen gas, liquid water and electrons) must be present all at the same time. The most crucial factor is the ease of oxygen gas access to the active area where the reaction takes place.

It should be understood that the terms, "upper," middle," "lower," etc. in the following discussion relate only to the relative placement of the layers in the FIG. under discussion and are not necessarily applicable to the structure while it is in use.

Figure 9A:
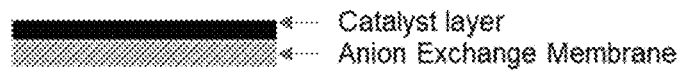
FIGS. 9A and 9B show details of the contact interface between the catalyst layer and the anion diffusion membrane of an exemplary bilayer gas diffusion electrode (GDE)

A key feature of the inventive gas diffusion electrode (GDE), also referred to herein as an oxygen depolarized cathode (ODC) or a gas diffusion cathode (GDC) is that the catalyst layer is deposited directly on the anion exchange membrane, as shown in FIG. 9A as a cross section. This catalyst coated membrane (CCM) structure allows for better ion (OH– or other anions in the gas stream) transport through the contact interface between the catalyst and membrane. It should be understood that the catalyst coated membrane refers to the anion exchange membrane at the interface between the cathode and base compartment which is coated with a catalyst layer at one side. Importantly, this gas diffusion electrode that has the hydrophilic catalyst layer applied directly under the anion exchange membrane is used only on the cathode side in all of the membrane electrolysis cells disclosed herein.

Figure 9B:
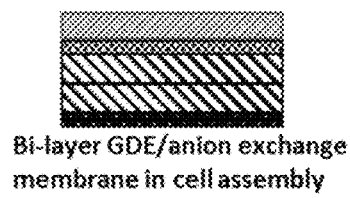

FIG. 9B shows a cross sectional view of the bilayer ODC showing how the catalyst layer is in direct contact with a porous diffusion layer. The catalyst layer may be hydrophilic or hydrophobic depending on the operation. Looking closely at FIG. 9B, the uppermost layer in FIG. 9B is the anion exchange membrane. In a membrane electrolysis cell as described herein, the anion exchange membrane will be facing the base build up chamber, in the case of the first embodiment (five compartment) membrane electrolysis cell described above. Directly below the anion exchange membrane is a hydrophilic catalyst layer. This hydrophilic catalyst layer is disposed directly on the first gas diffusion layer (GDL). As shown in FIG. 9B, below the first gas diffusion layer is an optional second gas diffusion layer. These gas diffusion layers are known in the art and are hydrophobic.

The gas diffusion layer may be made of for example, carbon fiber paper, carbon felt, carbon cloth, porous metal structures, or other porous materials which can conduct electrons and provide ability for a gas to diffuse. The reduction reaction of water to produce hydrogen can occur on many different materials depending on the voltage applied to the electrode. Without wishing to be bound by theory, the gas diffusion electrode as disclosed herein may ensure that any hydrogen that is produced due to reduction of water may react with oxygen to produce water. This water is then available to take part in the reduction of oxygen at the cathode to produce OH–.

Finally, disposed directly on the second gas diffusion layer is an optional hydrophobic catalyst layer. Importantly, if this optional second catalyst layer is present, it is a hydrophobic catalyst layer. If the optional second gas diffusion layer is not present, the optional hydrophobic catalyst layer may be disposed directly on the opposite side of the first gas diffusion layer from the required hydrophilic catalyst layer. Both the hydrophobic catalyst layer and the hydrophilic catalyst layer comprise a commercially available platinum/carbon powder, as is known in the art. The Pt/C catalyst, also referred to as an electrocatalyst, is mixed with an anion conducting ionomer. The addition of an anion conducting ionomer allows for better transport of OH– ions from the reaction site toward the catalyst layer/membrane interface. It also serves as the binder for the platinum/carbon powder or another electrocatalyst. The binders may be polymers that have both hydrophilic and hydrophobic nature. The binders may be polymers that are exclusively hydrophobic or exclusively hydrophilic. For example, Nafion® (DuPont) ionomer is hydrophobic with hydrophilic pores while Teflon® (DuPont) may be used as a binder as well but is only hydrophobic. The specific nature of the binder should allow gas diffusion, electrical conductivity and ionic conductivity. In most cases, this is a balance of the amount of binder and catalyst. If there is too much polymer, the electrons will not be conducted but if there is too little binder, the catalyst layer will not be stable. The catalyst layer which comprises this mixture is hydrophilic. The anion exchange ionomer may be an ionomer, i.e, a polymer having some amount of ionizable copolymerized monomers. The ionomer may be a dispersed solution in a liquid which is mixed with the catalyst and applied on the gas diffusion layer. An exemplary method of creating the ionomer binder may be to provide the ion exchange membrane is a solvent. This solution may be combined with the catalyst and applied to the gas diffusion layer to produce the catalyst layer and thereby produce the gas diffusion electrode. Some ion exchange membranes may be available as ionomers and do not need to be dissolved. Some such anion exchange membranes are available commercially. Non-limiting examples of such materials are the Fumion® FAA-3 ionomer from FuMA-Tech, which comprises a polyaromatic polymer, quaternary ammonium group(s) and has bromide (Br–) as the counterion, or the anion exchange ionomer from Ionomr (Vancouver, BC, Canada) are suitable, for example.

Figure 10:
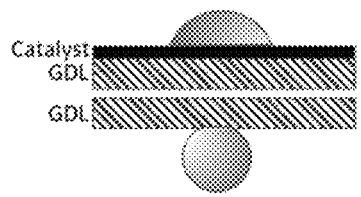
FIG. 10 shows a first embodiment of a bilayer gas diffusion electrode (GDE)
Figure 11:
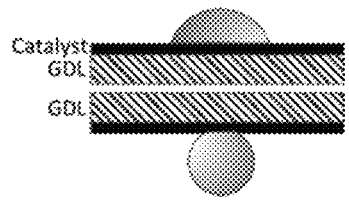
FIG. 11 shows a second embodiment of a bilayer gas diffusion electrode (GDE)

The hydrophilic/hydrophobic character of the gas diffusion electrode used as the oxygen depolarized cathode as described herein is shown schematically in FIGS. 10 and 11. The hydrophilic or hydrophobic nature of the catalyst layers are indicated by the water droplets shown on the schematic diagrams. The anion exchange membrane is not shown in FIGS. 10 and 11. FIG. 10 shows an embodiment of the gas diffusion electrode wherein the optional hydrophobic catalyst layer is not present. However, since the gas diffusion layer itself is hydrophobic, the water droplet sitting on the gas diffusion layer indicates that the layer is hydrophobic. The non-optional hydrophilic catalyst layer which is disposed directly on the gas diffusion layer and under the anion exchange membrane (not shown) is shown and is reported as hydrophilic by the partially adsorbed water droplet in FIG. 10. FIG. 11 is similar to FIG. 10, but does show the optional hydrophobic catalyst layer, indicated by the water droplet that is not adsorbed on the catalyst layer. Like FIG. 10, the anion exchange membrane is not shown, but is understood to be present and disposed on the surface of the hydrophilic catalyst layer opposite the side disposed on the gas diffusion layer.

The benefits of the bilayer GDE (i.e., having the hydrophilic catalyst layer deposited directly under the anion exchange membrane and on top of the gas diffusion layer) stem from two distinct functionalities of its structure. First, the unique structure promotes the reaction of oxygen reduction to hydroxyl ions, reaction 12) rather than the undesirable hydrogen gas formation through reaction 13).

$$O_2 + 2H_2O + 4e^- \rightarrow 4OH^- \qquad 12)$$

$$2H_2O + 2e^- \rightarrow 2OH^- + H_2 \qquad 13)$$

Hydrogen gas formation is undesirable because: (a) there is about 1V for the overall cell voltage (i.e. extra energy consumption) when reaction 13) occurs and (b) the hydrogen gas will make the operation of such cells unsafe due to the presence of oxygen gas, hydrogen gas and platinum catalyst at the same time in the cathode compartment.

Figure 12:
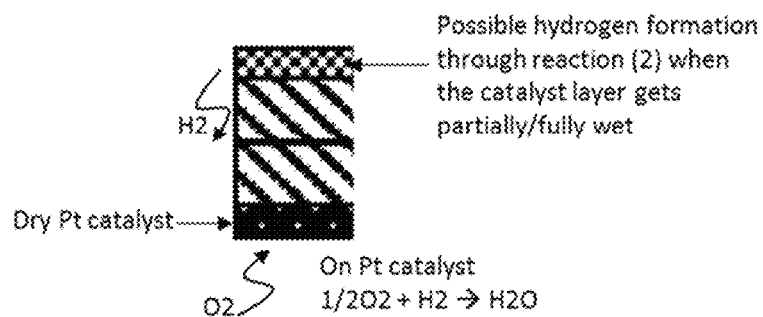
FIG. 12 shows a schematic of functionality of the bilayer gas diffusion electrode.

Second, the specific configuration of hydrophilic and hydrophobic layers in this bilayer gas diffusion electrode allows for two simultaneous processes. First, and importantly, the hydrophobic diffusion layer support and the optional hydrophobic bottom catalyst layer (if present) ensure that the humidified gaseous stream (oxygen or air) has easy access to the hydrophilic catalyst layer facing the anion exchange membrane at all times which results in greatly improved mass transport, increasing the output capacity of the membrane electrolysis cell. The hydrophobic catalyst layer (if present) at the bottom of the bilayer gas diffusion electrode also ensures that any possible hydrogen gas formed at the hydrophilic catalyst layer facing the anion exchange membrane is immediately combined with the incoming oxygen to form water. The hydrophobic nature improves the reaction by pushing the water away from the electrode and preventing the catalyst sites from becoming flooded. If the catalyst sites are flooded with water, the oxygen will not be able to reach the cathode and the desired oxygen reduction reaction with water to produce anions will not occur. This is shown schematically in FIG. 12. Therefore the hydrophilic catalyst layer facing the anion exchange membrane provides for optimal cell performance and reduced contact resistance, i.e. better ionic contact, while the other (optional) catalyst layer of the gas diffusion electrode must be hydrophobic, (if present) to make sure that any water that may come in with the air or through the anion exchange membrane or is formed through the chemical reaction of oxygen and hydrogen at the Pt catalyst is reacted with oxygen in the gas diffusion layer of the cathode. Thus, hydrogen gas will contact the platinum in the hydrophobic catalyst layer on the bottom of the gas diffusion electrode as it exits the cell. The platinum catalyzes the reaction of the hydrogen and oxygen to water allowing the water to either react with oxygen electrochemically through the oxygen reduction reaction to produce hydroxide ions or to exit the system as water without reacting.

Figure 13:
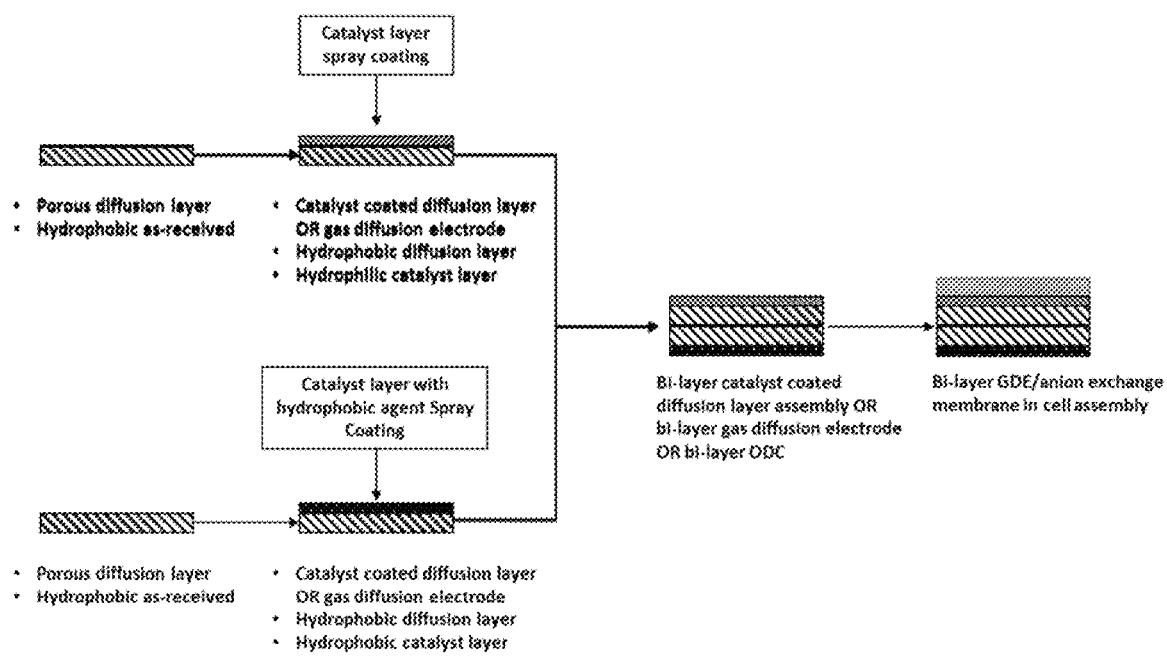
FIG. 13 shows a schematic of exemplary process steps to make the gas diffusion electrode used as the oxygen depolarized electrode.
Figure 14:
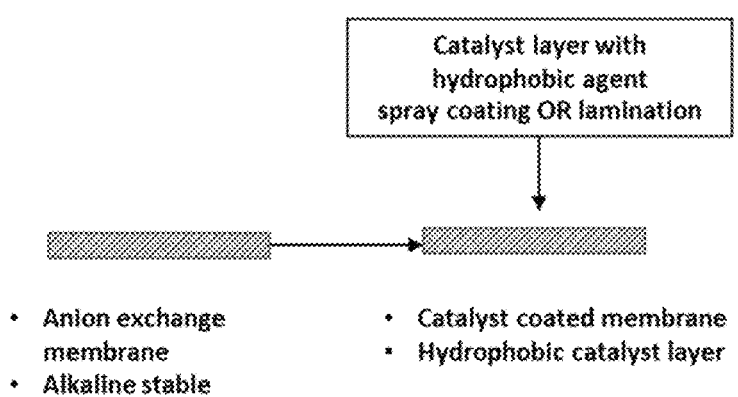
FIG. 14 shows a schematic of producing an embodiment of a catalyst coated membrane for use with an oxygen depolarized cathode.

FIGS. 13 and 14 demonstrate a process for producing the bilayer gas diffusion electrode used as the oxygen depolarized cathode. As shown in FIG. 13, the process starts with two separate layers of the hydrophobic gas diffusion layer. In the following discussion, these gas diffusion layers will be called "top" and "bottom" which refers only to their relative positions FIG. 13.

The top gas diffusion layer is coated with a catalyst ink to provide the hydrophilic catalyst layer. The ink is a mixture of Pt/C catalyst powder and an anion exchange ionomer (serves as a binder and anion transferring agent) as described above. The bottom gas diffusion layer is likewise coated with a catalyst ink containing a hydrophobic agent, e.g. a polytetrafluoroethylene (PTFE) dispersion. The ink is a therefore a mixture of Pt/C catalyst powder, an anion exchange ionomer, which permits that catalyst layer to transport anion and, a PTFE dispersion (Teflon® is an example of such a material), which serves to render the catalyst layer hydrophobic. Next, the two coated gas diffusion layers are placed together such that the uncoated sides are facing each other. The anion exchange membrane is disposed on the hydrophilic catalyst layer. In operation, it should be understood that completed oxygen depolarization cathode is oriented such that the hydrophilic catalyst layer is facing the anion exchange membrane which may face the base build up compartment, and hydrophobic catalyst layer is therefore facing the incoming gas stream, which comprises $O_2$ and preferably is air and more preferably is humid air. Regarding the process as shown in FIG. 13, it is clear that instead of two separate gas diffusion layers, each coated separately and then placed together with coated sides to the exterior, another embodiment of the process would be to coat each side of a single gas diffusion layer.

FIG. 14 shows an embodiment of a catalyst coated membrane that could be used with a cathode, and would perform in a similar manner to the bilayer ODC described above. As shown schematically in FIG. 14, this embodiment comprises only the critical elements of the ODC. These are the Pt/C catalyst combined with the anion exchange ionomer and the hydrophobic agent as the catalyst ink that is coated onto the alkaline stable anion exchange membrane. In this way, it would be possible to flow $O_2$ through the catalyst layer, while the anion exchange membrane faces the base build up chamber. The main advantage of the catalyst coated membrane is the improved contact resistance at the interface between the catalyst layer and membrane. In terms of functionality, it performs in similar manner as to the bilayer GDE or ODC.

Figure 15A:
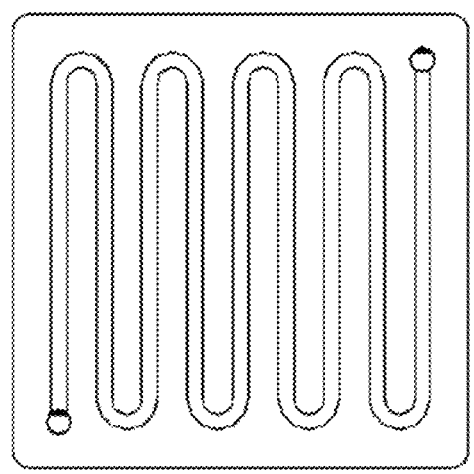
FIGS. 15A and 15B show top and side cross sectional views, respectively, of an embodiment of a flow field on the cathode compartment.
Figure 15B:
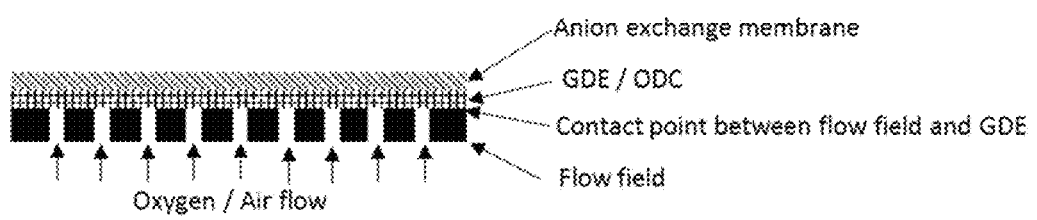

The oxygen diffusion cathode as described above may optionally comprise a flow channel at the back side of the bilayer ODC. The flow channel serves two purposes. The first is that it provides improved distribution of the gas (air or oxygen). The flow channel can be serpentine, multiple serpentine, parallel flow, or interdigitated. Secondly, the "landing" parts of the flow field also act as pressure points, thereby providing uniform and sufficient contact through the overall cell. An example of a serpentine flow field in cathode compartment is shown in FIG. 15A as a top view. FIG. 15B shows a cross sectional side view of the channels created by such a serpentine flow channel. The dark squares are the contact points of the flow field (i.e. the gas) and the gas diffusion electrode/oxygen depolarized cathode.

Thus, the inventive bilayer gas diffusion electrode which preferably is used as the oxygen depolarized cathode in all of the embodiments of the membrane electrolysis cell described here has as part of its inventive feature two layers, unlike the single layer gas diffusion electrode. It is this unique geometry that allows these ODC's to use air, rather than pure oxygen. In addition, the air may be humid or humidified, i.e., ambient undried air may be fed directly to the gas diffusion electrode. The ODC also may use waste gas streams comprising oxygen as the oxygen source, for example an enriched oxygen stream resulting from a nitrogen production process.

Regarding all embodiments of the ODC, it may have the following attributes:
Porous to allow for gas diffusion therein;
Ability to use humidified or humid undried ambient air as the oxygen source;
Ability to use waste gas streams comprising oxygen as the oxygen source;
Electrically conductive to allow for electrons to move;
Ionically conductive to allow the OH– product to diffuse out;
It may comprise a catalyst that can catalyze the oxygen reaction, which is shown as reaction 8).
Hydrophobicity, i.e. the membranes may be hydrophobic;
Hydrophilicity; the membranes may also be hydrophilic;
The electrodes may comprise bilayer catalysts, i.e. the individual catalyst layers themselves may have more than one layer and each layer may comprise a different catalyst to enhance their ion transport ability;

Regarding the dimensionally stable anode (DSA) it may have the following attributes:
May also be a gas diffusion electrode to allow for the optional use of $H_2$ gas at the anode.
Electrically conductive to allow for electrons to move;
Ionically conductive;

It may comprise an optional catalyst to catalyze the reactions at the anode. If hydrogen gas is applied to the anode, the reaction is shown as reaction 14).

$$H_2 \rightarrow 2H^+ + 2e^- \tag{14}$$

Figure 16:
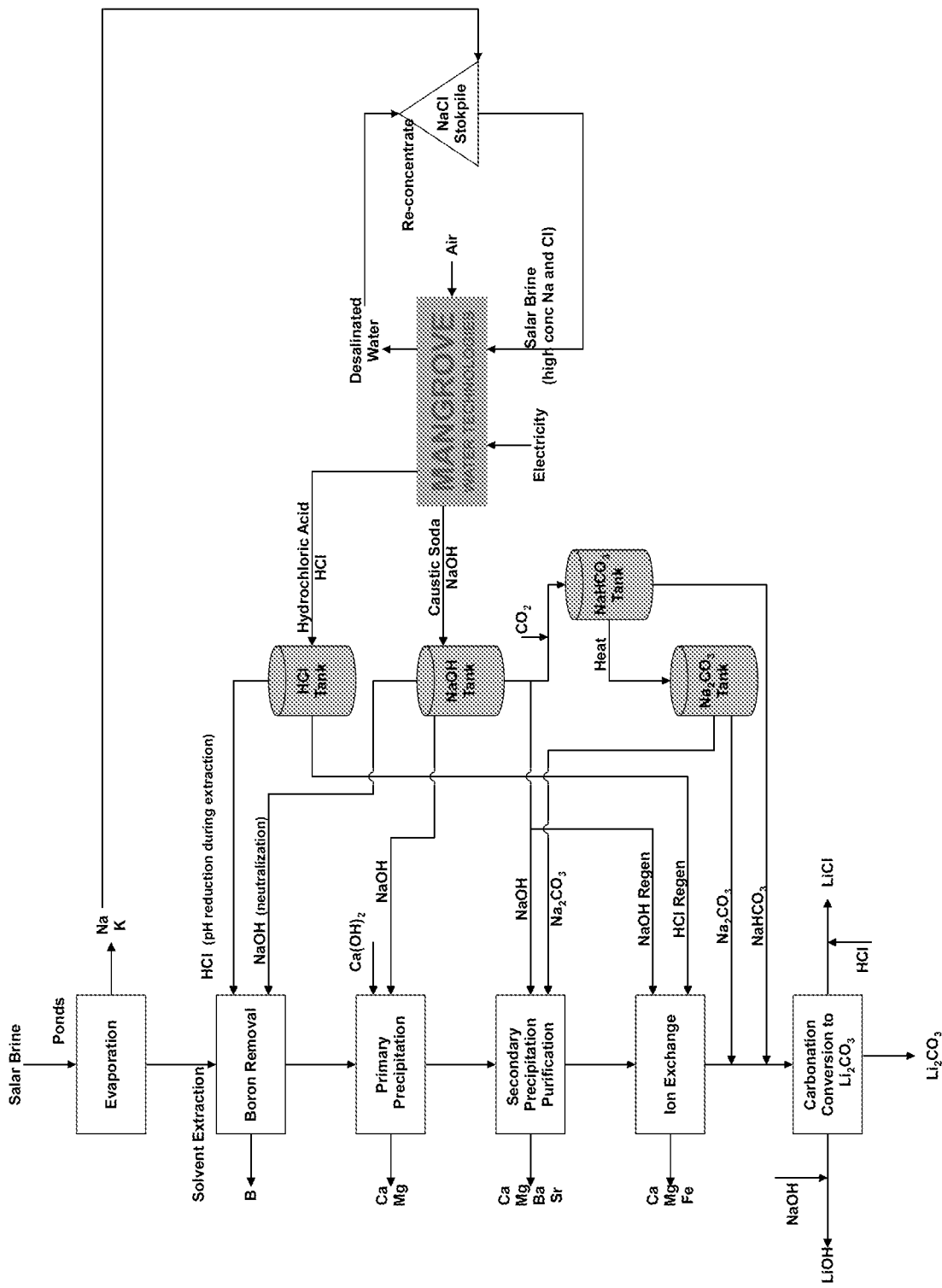
FIG. 16 shows a process flow diagram for use of an embodiment of the membrane electrolysis cell as incorporated into a process for Li recovery from brine.

Incorporation of Membrane Electrolysis Cell Comprising Gas Diffusion Electrodes into Lithium Recovery Processes A salar brine lithium recovery process which utilizes the membrane electrolysis cell to is shown in FIG. 16. As can be seen, the sodium chloride salt extracted from the evaporation stage in lithium brine recovery process is fed into the membrane electrolysis cell as the feed brine. The feed brine then undergoes a depletion process as it passes through the cell. The depletion is a result of the Na+ and OH− ions migrating out of the salt depletion compartment into the base build up and the acid build up compartments, respectively.

The ions that migrate out of the salt depletion chamber depend on what ionic species are in the feed brine that is fed to the membrane electrolysis cell. Hence, the desalinated water removed from the salt depletion compartment can be re-concentrated and therefore recycled as feed brine using the readily available salt (NaCl) stockpile from the salts that are precipitated from the salar lake evaporation ponds. The concentration of feed brine plays an important role in providing the mass transfer of the feed brine as well as supplying ions for acid and base generation. Although the membrane cell can be operated at feed brine concentrations as low as 0.1 wt. % of salt, it is beneficial to operate at the maximum available feed brine concentrations.

The concentration of product acid and base that are removed from the acid and base build up chambers, respectively, may be adjusted according to the requirements of each particular process. Caustic soda (NaOH) concentrations in the range of 5-20 wt. % may be achieved using the membrane electrolysis cell disclosed herein. As shown in FIG. 16, typical uses of the NaOH produced in the membrane cell in a salar brine lithium recovery operation include, but are not necessarily limited to:

Neutralization and pH adjustment after the solvent extraction process to recycle the solvent;
Provide alkalinity for precipitation and hardness removal;
Regeneration of the ion exchange resins used for hardness and metal removal;
Conversion of lithium carbonate into lithium hydroxide through caustization process.

All of the above-mentioned processes require caustic (NaOH) concentrations in the range of 5-20 wt. % which is within the range achievable by the membrane electrolysis cell.

Non-limiting examples of typical uses of the hydrochloric acid that can be produced by the membrane electrolysis cell during a lithium brine recovery process is as follows:

Adjustment of pH to remove boron during the solvent extraction process;
Regeneration of the ion exchange resins used for hardness and metal removal;
Conversion of lithium carbonate into lithium chloride.

A concentration of hydrochloric acid for the above-mentioned applications is in the range of 4-12 wt. % which is achievable by the membrane electrolysis cell.

Figure 17:
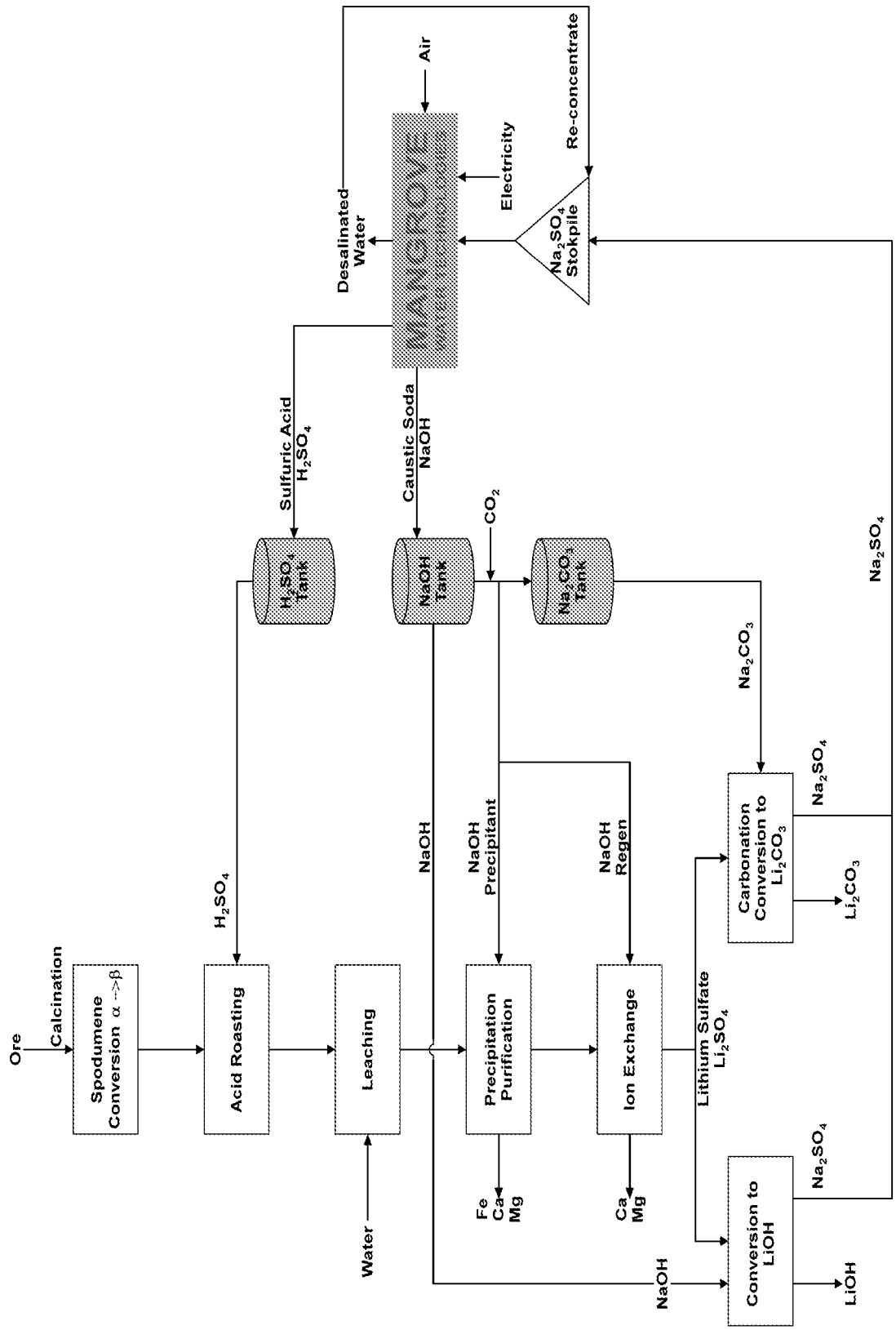
FIG. 17 shows a process flow diagram for use of an embodiment of the membrane electrolysis cell as incorporated into a process for Li extraction from mineral rock.

A lithium rock mining operation process which incorporates the membrane electrolysis cell is shown in FIG. 17. As can be seen, the sodium sulfate ($Na_2SO_4$) salt which is the largest by-product of a lithium rock mining operation can be used as a feed brine to the membrane electrolysis cell. As shown in FIG. 17, feeding $Na_2SO_4$ to the membrane electrolysis cell will produce NaOH and $H_2SO_4$ as the base and acid, respectively. These can be recycled and used as reagents in the lithium recovery process.

Sulfuric acid ($H_2SO_4$) is the main reagent necessary for extracting the lithium from the ore during the acid roasting process. As shown in FIG. 17, this chemical can be regenerated from the readily available sodium sulfate by-product of the lithium ore hard rock mining operation.

Likewise, the sodium hydroxide that is produced can be used in a variety of ways in the overall lithium production process. Non-limiting examples of uses of sodium hydroxide during a lithium rock mining operation are as follows:

Provide alkalinity for precipitation and hardness removal;
Regeneration of the ion exchange resins used for hardness and metal removal;
Conversion of lithium sulfate into lithium hydroxide by adding NaOH to the process.

All above mentioned processes require NaOH concentrations in the range of 5-20 wt. % which is within the range achievable by the membrane electrolysis cell.

Figure 18:
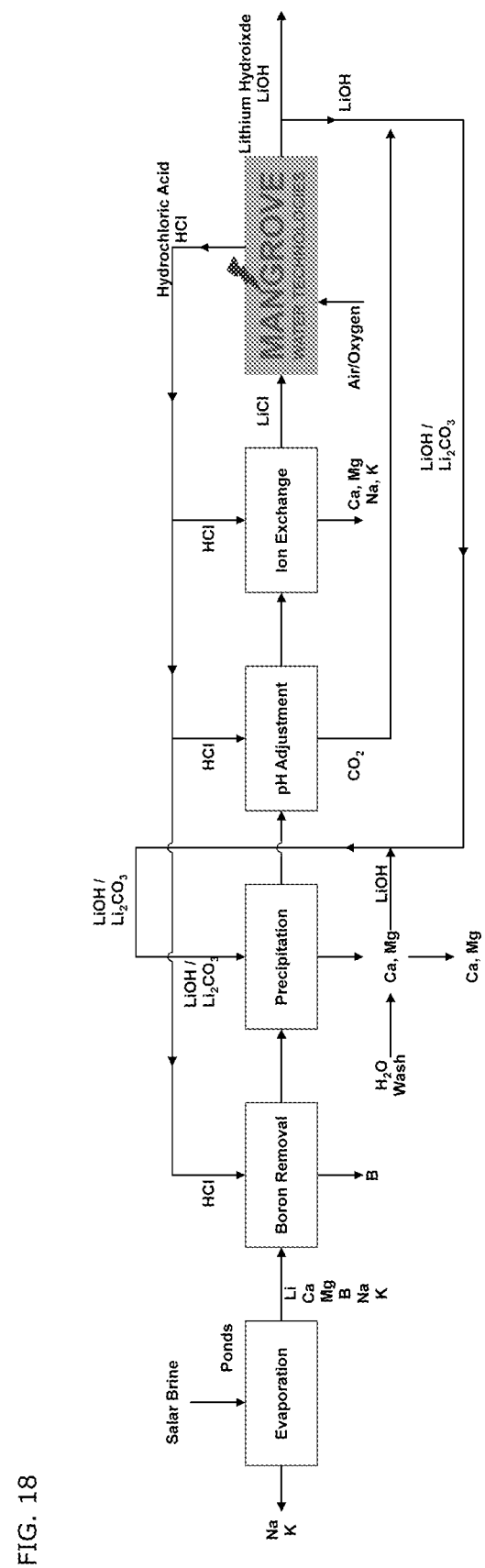
FIG. 18 shows a process flow diagram for use of an embodiment of onsite LiOH and $Li_2CO_3$ and HCl generation from LiCl brine as incorporated into a Li recovery process from salar brines by the conversion of LiCl→LiOH+HCl.

FIG. 18 shows a first embodiment of onsite LiOH and HCl generation from LiCl using the unique membrane electrolysis cell as disclosed herein. In the embodiment shown in FIG. 14, the membrane electrolysis cell is used to convert LiCl into LiOH in a lithium recovery from a salar brine process. As shown in FIG. 18, the brine feed to the membrane electrolysis cell is an solution of LiCl, which is fed to the salt depletion chamber of the membrane electrolysis cell, shown in FIGS. 3-7. Oxygen gas, which is preferably in the form of air is fed to the cathode. The oxygen or air may optionally be humidified, e.g., by bubbling the gas through water before feeding it to cathode. The air may optionally be purified. As shown, the outputs from the cell are LiOH, which is removed from the base build up chamber (FIGS. 3-7) and HCl, which is removed from the acid build up chamber (FIGS. 3-7). Desalinated water may be optionally removed from the cell, although this stream is not shown in FIG. 18. Whether or not desalinated water is removed from the cell depends on the concentration of the feed brine, i.e. the aqueous LiCl solution, as well as the desired concentration of LiOH and HCl that are produced.

In an analogous manner, water may optionally be fed to the cell, rather than being removed. Whether or not water is fed to the cell depends on the concentration of the feed brine, i.e. the aqueous LiCl solution, as well as the desired concentration of LiOH and HCl that are produced. As shown in FIG. 18, in this embodiment, the HCl can be used to regenerate the ion exchange resins that are used to remove Ca, Mg, Na, and K from the LiCl process stream that enters the cell. The HCl may also be used in the boron removal step to regenerate the ion exchange resin, which is typically after the evaporation/precipitation step near the beginning of the process. The HCl may be used for pH adjustment of the process stream which generates $CO_2$ as shown in the FIG. 18. The $CO_2$ can be combined with a portion of the LiOH product stream, thereby producing a stream that comprises LiOH and $Li_2CO_3$. The LiOH/$Li_2CO_3$ stream can be fed to the precipitation step that removes Ca and Mg, as shown in FIG. 18. Importantly, not all of the LiOH product stream is used in this precipitation step, because the LiOH is the desired product. However, the ability to use the LiOH in this way, reduces significantly the need to buy a base such as NaOH or $Na_2CO_3$ to effect the precipitation removal of Ca and Mg.

As a point of reference, based on a test using 6% LiCl stream used as a brine feed, it takes about 150-250 kWh/m³ of LiCl brine to reduce the total salt content to 3% when air is used at the ODC.

Figure 19:
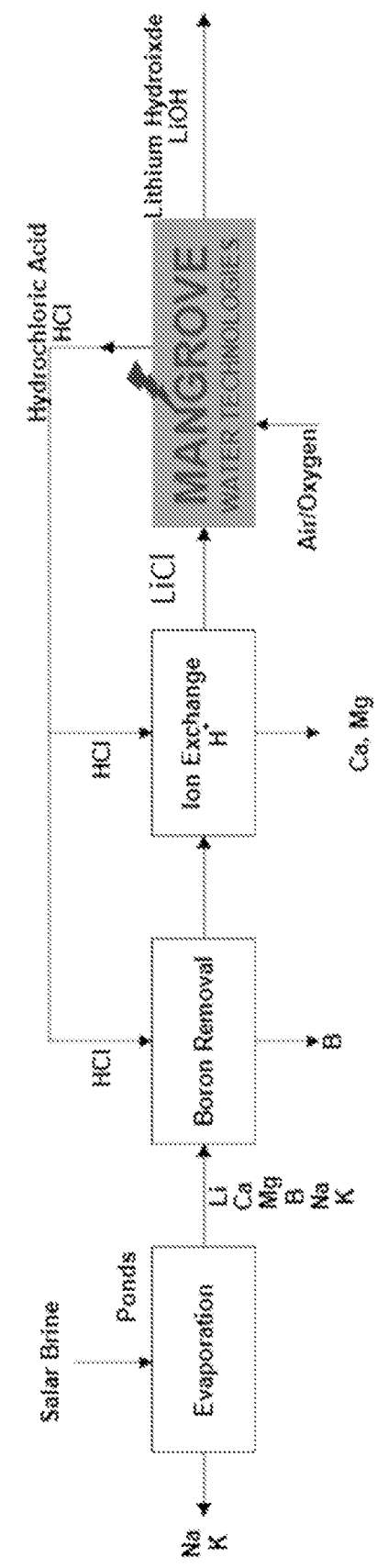
FIG. 19 shows a process flow diagram of an embodiment of onsite LiOH and $Li_2CO_3$ and HCl generation from LiCl brine as incorporated into a recovery process of Li from salar brines by the conversion of LiCl→LiOH+HCl.

FIG. 19 depicts a second embodiment implementation of the membrane electrochemical cell in the recovery of lithium from a salar brine. In this embodiment, an aqueous LiCl solution is again the brine feed to the membrane electrolysis cell. In this embodiment, like the first embodiment, the membrane electrolysis cell is used to convert LiCl into LiOH. The aqueous solution of LiCl is fed to the salt depletion chamber of the membrane electrolysis cell, shown in any of FIGS. 3-7 in more detail. Oxygen gas, which is preferably in the form of air, is fed to the cathode. The oxygen or air may optionally be humidified, e.g., by bubbling the gas through water before feeding it to cathode and the air may optionally be purified. As shown, the outputs from the cell are LiOH, which is removed from the base build up chamber (FIGS. 3-7) and HCl, which is removed from the acid build up chamber (FIGS. 3-7). As in the first embodiment, desalinated water may be optionally removed from the cell, although this stream is not shown in FIG. 19.

Whether or not desalinated water is removed from the cell depends on the concentration of the feed brine, i.e. the aqueous LiCl solution, as well as the desired concentration of LiOH and HCl that are produced. In an analogous manner, water may optionally be fed to the cell, rather than being removed. Whether or not water is fed to the cell depends on the concentration of the feed brine, i.e. the aqueous LiCl solution, as well as the desired concentration of LiOH and HCl that are produced. In this embodiment, all of the LiOH that is produced is removed, i.e. there is not a recycle stream comprising LiOH.

However, the HCl stream as in the first embodiment may be recycled and used in the lithium recovery process. As shown in FIG. 19, the HCl is used to regenerate the ion exchange resins used to remove the Ca and Mg from the process stream just prior to the stream being fed to the membrane electrolysis cell as the feed brine. The HCl produced may also be used to in the removal of the boron B, after the precipitation step to regenerate the ion exchange resin.

Figure 20:
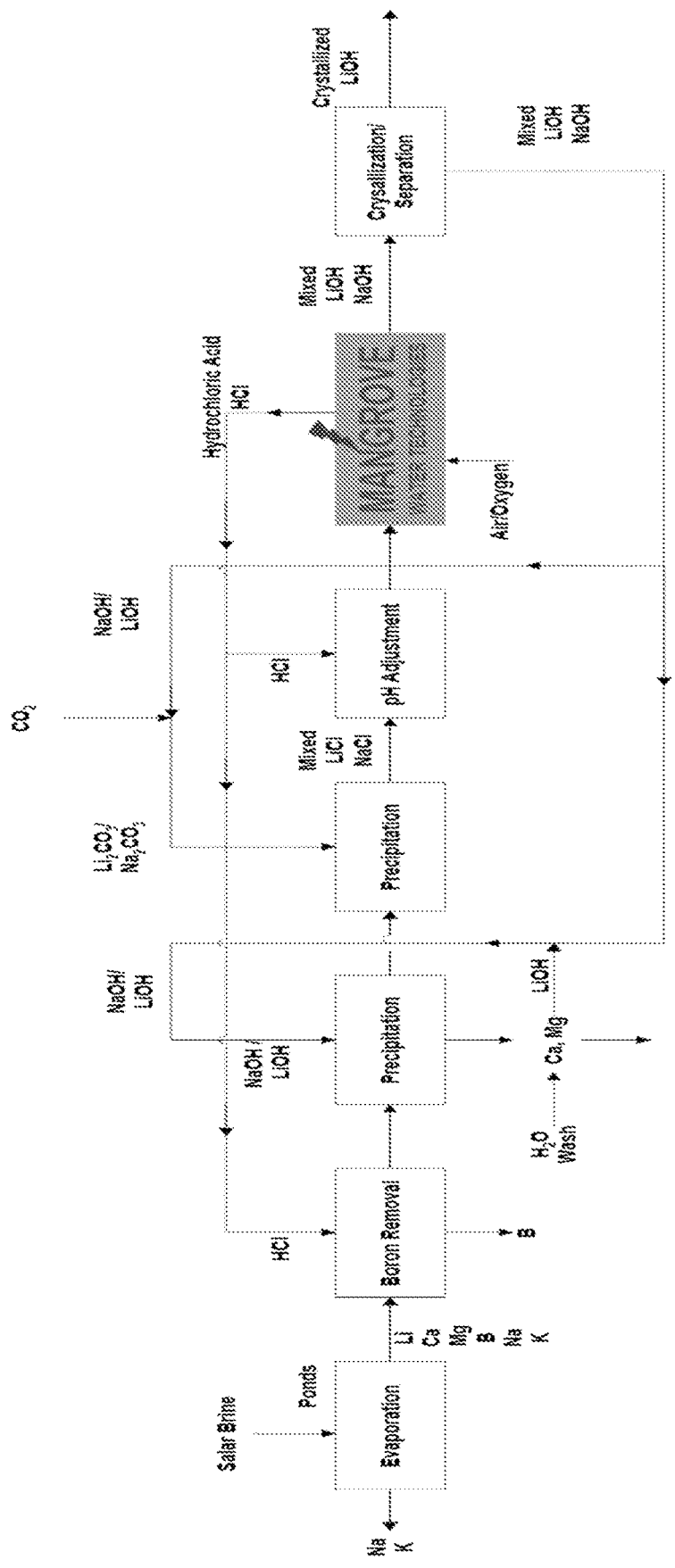
FIG. 20 shows a process flow diagram of an embodiment of onsite crystallized LiOH generation from mixed LiCl and NaCl brine as incorporated into a recovery process of Li from salar brines by the conversion of LiCl→LiOH+HCl and by the conversion in the same cell of NaCl→NaOH+HCl.

FIG. 20 shows a third embodiment illustrating use of the membrane electrolysis cell in a lithium production process. In this embodiment of the process, a mixed brine solution comprising both LiCl and NaCl are fed to the membrane electrolysis cell. The cell then produces HCl and a mixed LiOH and NaOH solution. This mixed LiOH and NaOH solution is fed to a crystallization/separation step that produces crystalized LiOH and a mixed solution of NaOH and a lower concentration of LiOH than the mixed LiOH and NaOH solution that was fed to the crystallization/separation step. As can be seen in FIG. 20, the process is similar to that of FIGS. 16 and 18, but utilizes the membrane electrolysis cell into an existing operation to produce LiOH from salar brine. In an alternative embodiment, the membrane electrolysis cell may be applied to another waste or recycle lithium chloride stream produced in a conventional lithium operation that does not have sodium, and could convert the lithium chloride to lithium hydroxide and hydrochloric acid.

The steps are thus:

Step 1: The mixed lithium chloride and sodium chloride stream that is produced from a conventional salar brine processing operation is fed to the membrane electrolysis cell (electrochemical cell) to produce a mixed lithium hydroxide and sodium hydroxide solution.

Step 2: The mixed lithium hydroxide and sodium hydroxide are sent to a crystallizer/separator where they are separated due to the large solubility difference between the two salts—the NaOH is much more soluble in water than the LiOH. The crystallization/separation unit may either evaporate and optionally re-condense the water, or may simply effect the precipitation of some of the LiOH by cooling the mixed solution of NaOH and LiOH. The more typical method is simply to evaporate the water. The lithium hydroxide is crystallized while the sodium hydroxide remains in solution. The crystallized lithium hydroxide is ready for market.

Step 3: Some lithium hydroxide remains in solution with the sodium hydroxide and is recycled back to the process for use in the precipitation stages.

Step 4: Some lithium hydroxide and sodium hydroxide is combined with carbon dioxide to produce a mixed lithium carbonate and sodium carbonate stream which is recycled back to the overall process and used for further precipitation, which can be seen in FIG. 20.

Taken together, these steps result in a closed or nearly closed loop for sodium hydroxide, sodium carbonate and lithium carbonate by the incorporation of the electrochemical cell (membrane electrolysis cell) into the overall process to recover LiOH from salar brine.

Figure 21:
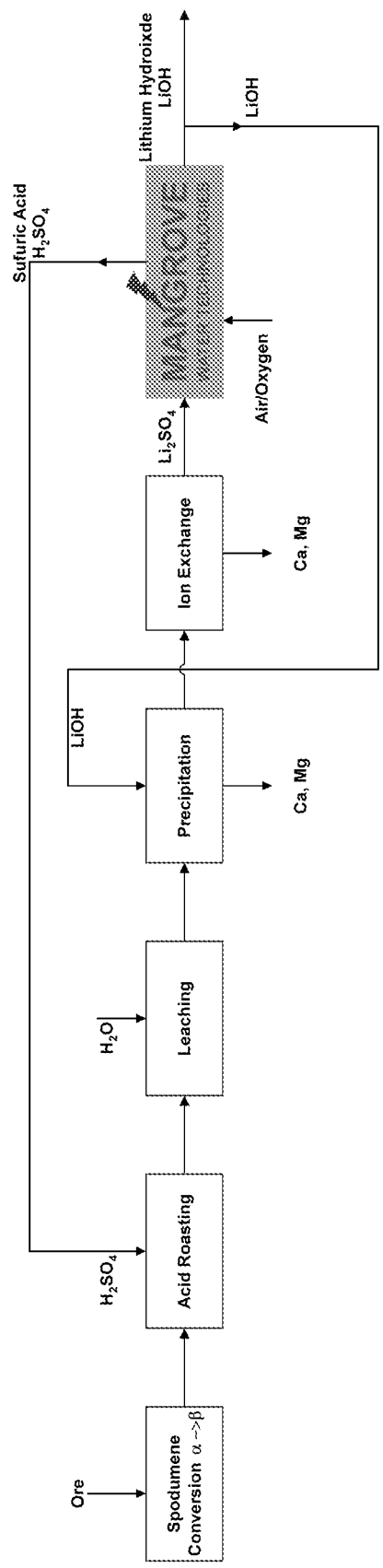
FIG. 21 shows a process flow diagram of an embodiment of onsite LiOH and $H_2SO_4$ generation from $Li_2SO_4$ as incorporated mid-stream into a process of lithium recovery in a hard rock mining operation by the conversion of $Li_2SO_4$→$LiOH+H_2SO_4$.

Turning next to FIG. 21, fourth embodiment use of the membrane electrolysis cell in a lithium production process is shown. As shown in FIG. 21, the membrane electrolysis cell is used to convert $Li_2SO_4$ to LiOH in a process where lithium is produced from a lithium-containing ore. However, a person having skill in the art can appreciate that the brine feed stream which comprises an aqueous solution of $Li_2SO_4$ does not necessarily have to be from a lithium ore-based process.

In certain brine recovery processes it is desirable to convert a $Li_2SO_4$ solution to a LiOH, and so the membrane electrolysis cell could be used in such a process as well. As shown in FIG. 21, the membrane electrolysis cell uses an aqueous solution of $Li_2SO_4$. Also fed to the cell, as in the other embodiments, is a gas stream which comprises oxygen. This stream which preferably is air, is fed to the cathode. The oxygen or air may optionally be humidified, e.g., by bubbling the gas through water before feeding it to cathode and the air may optionally be purified. As shown, the outputs from the cell are LiOH, which is removed from the base build up chamber (FIGS. 3-7) and $H_2SO_4$, which is removed from the acid build up chamber (FIGS. 3-7).

As in the first embodiment and the second embodiment, desalinated water may be optionally removed from the cell, although this stream is not shown in FIG. 21. Whether or not desalinated water is removed from the cell depends on the concentration of the feed brine, i.e. the aqueous $Li_2SO_4$ solution, as well as the desired concentration of LiOH and $H_2SO_4$ that are produced. In an analogous manner, water may optionally be fed to the cell, rather than being removed. Whether or not water is fed to the cell depends on the concentration of the feed brine, i.e. the aqueous $Li_2SO_4$ solution, as well as the desired concentration of LiOH and $H_2SO_4$ that are produced.

In this embodiment, both the LiOH and the $H_2SO_4$ are recycled back into the lithium recovery process, which mitigates at least some of the need to buy additional reagents. Importantly, only a portion of the LiOH is recycled, since of course the LiOH is a desirable end product. The $H_2SO_4$ is used in the acid roasting step of ore production, in order to produce the $Li_2SO_4$ brine solution after the water leaching step. A portion of the LiOH that is produced can be used to precipitate out Ca and Mg from the $Li_2SO_4$ brine solution after the water leaching step, as shown in FIG. 20.

Figure 22:
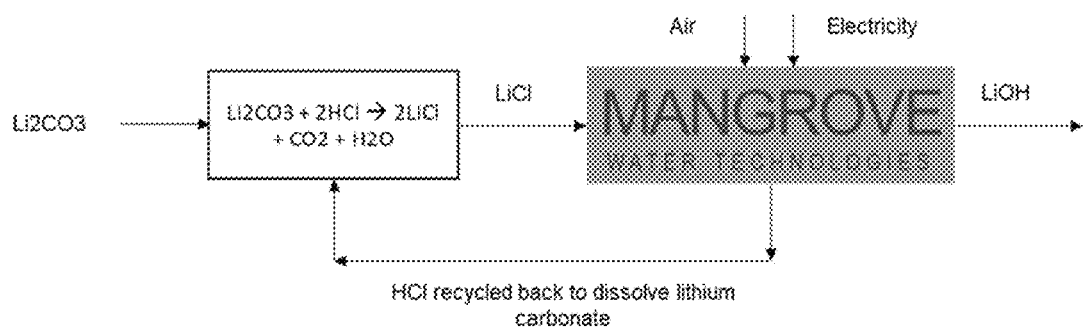
FIG. 22 shows a process flow diagram of an embodiment of LiOH production from $Li_2CO_3$, where HCl is produced and is recycled to dissolve the $Li_2CO_3$ in a closed-loop process.

FIG. 22 shows an exemplary embodiment of the use of the membrane electrolysis cell in a closed-loop process in which lithium carbonate ($Li_2CO_3$) produced from other methods, for example, lithium carbonate produced from brine operations by precipitation with the use of sodium carbonate or lithium carbonate produced from jadarite ($LiNaSiB_3O_7OH$) may be dissolved in hydrochloric acid to produce a lithium chloride solution which is converted to LiOH. The process as shown in FIG. 22 proceeds as follows:

Step 1: Lithium carbonate produced from other methods is converted to lithium chloride by dissolution in hydrochloric acid.

Step 2: The lithium chloride is processed through the electrochemical cell to produce lithium hydroxide and hydrochloric acid.

Step 3: The hydrochloric acid is recycled back for further conversion of lithium carbonate to lithium chloride resulting in a completely or substantially closed loop system.

As shown in the following three exemplary embodiments (FIGS. 23, 24, and 25), the membrane electrolysis cell may also be used in lithium recovery processes that incorporate ion exchange resins. These ion exchange resins may be used either directly to produce LiOH, or they may be used to recycle and/or recover other ionic species during the lithium recovery process. The use of the advantages of these embodiments (and all embodiments disclosed herein) are manifold vis-à-vis operational and capital cost savings.

As discussed above, lithium hydroxide is produced by processing lithium rich brines, such as salar brines, through an extensive process. The water in the brine is allowed to evaporate over a period of 6 to 18 months to concentrate the lithium chloride in the solution to 5 wt. % LiCl or higher and to precipitate out significant sodium, calcium and magnesium salt species, since these are in general less soluble than the LiCl.

The lithium chloride-rich brine must then be subjected to a variety of purification steps. These purification steps may include for example: boron removal through a solvent or other means, calcium and magnesium removal through the addition of lime (calcium oxide and/or calcium hydroxide) and caustic soda, soda ash and/or sodium bicarbonate or other species, further calcium and magnesium removal through the addition of soda ash, i.e., sodium carbonate $Na_2CO_3$. These processes produce a mixed lithium chloride and sodium chloride stream to which additional soda ash is added resulting in the precipitation of lithium carbonate. The lithium carbonate may then be crystallized. Currently, this crystallized lithium carbonate is often transported to a lithium hydroxide plant where it is converted to lithium hydroxide by adding calcium hydroxide. The lithium hydroxide is then crystallized for sale. There are several process units associated with all these steps and clearly, procuring and maintaining these process units represents significant capital investment as well as on-going operational costs.

An ion exchange resin selective to adsorption or binding of lithium can be used to eliminate many of these steps to selectively adsorb lithium from the salar brine (or other source) without the need for time-consuming evaporation or removal of boron, calcium, magnesium, etc. For instance, an ion exchange resin for selectively binding lithium and producing lithium chloride by desorbing the lithium from the resin with HCl could be utilized. A membrane electrolysis cell as disclosed herein can convert the lithium chloride to lithium hydroxide and the hydrochloric acid, which would be recycled back to the ion exchange resin, which the desirable lithium hydroxide is collected.

In another embodiment, an ion exchange resin for selective adsorption of lithium could also be used to produce lithium sulfate by regeneration of the resin with sulfuric acid. Analogously, the lithium sulfate would be fed to the electrolysis cell to produce lithium hydroxide and sulfuric acid. The sulfuric acid would be recycled back to the ion exchange resin to produce more lithium sulfate, while the desirable lithium hydroxide is collected.

The ion exchange resin would eliminate significant capital and operating expenditures and costs associated with the lithium evaporation ponds and associated downstream transportation.

Eliminating the evaporation ponds would also conserve water which is lost to the atmosphere during the evaporation step. Producers would be able to pump the lithium-depleted brine back to the salar brine reservoir, which conserves the water which would be evaporated. This feature is critical from both environmental and legal viewpoints. Chile, for example, where most of the world's lithium brines are located, has strict limits on water usage and the amount of brine lithium producers can pump. The purpose of the regulations is to conserve the scarce water in the Salar desert region of Chile. Therefore, these limits effectively mean that the producers' production of lithium is limited. However, if the lithium-depleted brine from the ion exchange process is pumped back to the reservoirs, much less net brine is pumped, and the producers can increase their production of lithium without exceeding the governmental limits on the amount of salar brine they can pump or amount of water used in the operation. Use of ion exchange resins in the lithium recovery process would also save time, since the evaporation step is slow. Additionally and importantly, the need to purchase reagents necessary for precipitation of calcium and magnesium would be eliminated.

The largest cost associated with direct production of lithium with ion exchange resins is with the need to procure HCl which is required to desorb or unbind the lithium ion from the active sites and regenerate the ion-exchange resin. An electrochemical cell as described herein that is capable of converting lithium chloride to lithium hydroxide and hydrochloric acid not only eliminates the need to procure the reagent required for the conversion of lithium chloride to lithium carbonate to lithium hydroxide, but these cells also produce the vital HCl required to extract the lithium from the ion exchange resin. Accordingly, the whole process starting from lithium chloride evaporation to lithium carbonate production and lithium carbonate conversion through to production of lithium hydroxide for use in batteries may be simplified to the use of only an ion exchange resin and an electrochemical cell.

In addition, another exemplary use of the membrane electrolysis cells in processes utilizing ion exchange resins to directly adsorb lithium from brine is a process where the ion exchange resin is deployed in the desert where the salar brine is pumped, while the membrane electrolysis cell is in a different location. In this exemplary process the ion exchange resin is removed, transported to the location of the membrane electrolysis cell where the ion exchange resin is regenerated with HCl thus producing LiOH. The ion-exchange resin would then be shipped back to the brine site in the desert. Thus, a used ion-exchange resin would move one way and the regenerated ion exchange resin would move the opposite way. Therefore, in any of the exemplary processes shown in FIG. 22, 23, or 24 below, the membrane electrolysis cell could be located in a different location from the ion exchange resin.

Non-limiting examples of suitable such ion exchange resins are those that selectively binds lithium or another precious metal based on the pH of the solution. For example, the resin may bind lithium in acid but not in alkali, or vice versa. This allows us to be able to regenerate the resin and extract lithium from it. This allows the producers to be able to regenerate the resin and extract lithium from it. The membrane electrolysis cell then produces the appropriate pH solution to remove the bound ion by providing HCl or NaOH. Such ion exchange resins may also include complexed metal resins such as $H_nM_nO_n$ where the H is hydrogen, M is a metal species, O is oxygen and n is an integer. Non-limiting examples include $LiAlO_2$, $LiCuO_2$, among others.

The following two embodiments thus demonstrate how the membrane electrolysis cell as disclosed herein may be incorporated into lithium recovery processes in which an ion exchange resin is used to directly produce LiOH.

Figure 23:
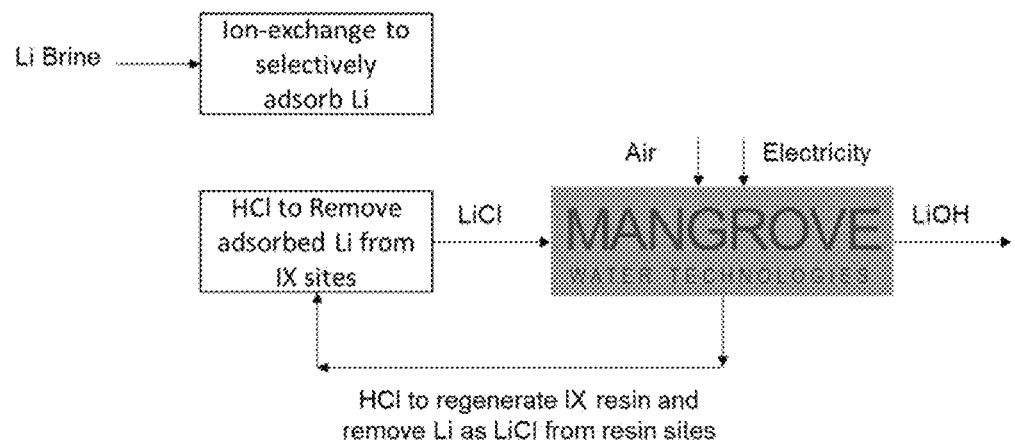
FIG. 23 shows a process flow diagram of an embodiment of LiOH production as incorporated into a recovery process of Li from a lithium brine by the selective adsorption of Li using an ion exchange resin by the conversion of LiCl→LiOH+HCl such that the HCl is used to regenerate the ion exchange resin.

FIG. 23 shows an exemplary embodiment of a use of the membrane electrolysis cell in a lithium production process where an ion exchange resin is used to selectively adsorb Li from a lithium brine. This lithium brine does not have to be a salar brine—it can be a brine from other industrial processes such as produced water from oil and gas operations, or geothermal brines which sometimes have lithium or naturally occurring saline aquifers, or the brine can be derived from a lithium ion battery recycling process. As can be seen in FIG. 23, the membrane electrolysis cell simultaneously produces LiOH, which can be sold, but also produces HCl which is used to remove the Li (as LiCl) from the ion exchange resin, thus regenerating the ion exchange resin. The LiCl is fed to the membrane electrolysis cell to produce the desired LiOH. In an alternative embodiment, lithium sulfate could be produced by using sulfuric acid and producing lithium sulfate which can be used to produce the desired lithium hydroxide in the membrane electrolysis cell. The steps in the process are as follows:

Step 1: Lithium containing brine or solution is processed with an ion exchange resin or other adsorbing agent to adsorb lithium out of the brine or solution.

Step 2: The lithium containing resin bead or adsorbent is regenerated with hydrochloric acid to produce a lithium chloride solution. The resin or adsorbing agent is regenerated to the proton form by HCl. Alternatively, the resin could be regenerated with sulfuric acid.

Step 3: The lithium chloride solution is processed through the electrochemical cell to produce lithium hydroxide and hydrochloric acid. Alternatively, the lithium sulfate solution could be processed through the electrochemical call to produce lithium hydroxide and sulfuric acid.

Step 4: The lithium hydroxide is sold to market or otherwise removed from the process while the hydrochloric acid is recycled back to Step 2.

Figure 24:
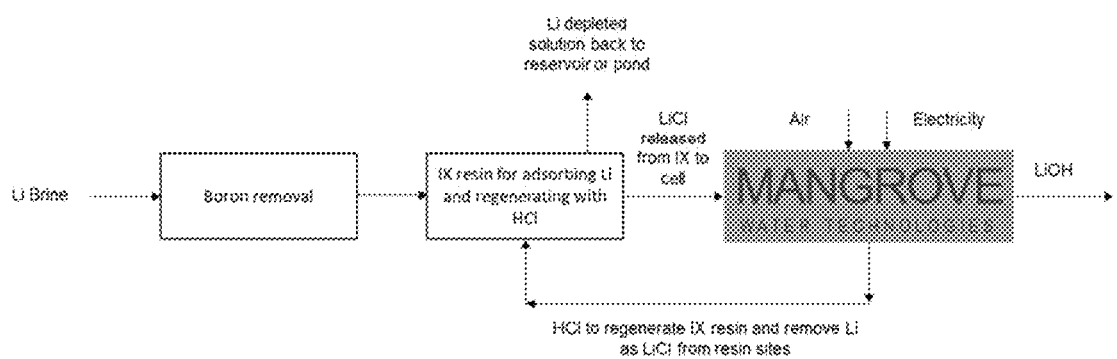
FIG. 24 shows a process flow diagram of another embodiment of LiOH production as incorporated into a recovery process of Li from a lithium brine by the selective adsorption of Li using an ion exchange resin by the conversion of LiCl→LiOH+HCl such that the HCl is used to regenerate the ion exchange resin.

FIG. 24 shows another exemplary use of the membrane electrolysis cell as disclosed herein in which the lithium-containing brine is subjected to a process in which boron is removed before the brine is sent to the ion exchange resin and then to the membrane electrolysis cell. As shown in FIG. 23, in this exemplary embodiment, the process steps after the boron removal are:

Step 1: Lithium containing brine or solution is processed with an ion exchange resin or other adsorbing agent to adsorb lithium out of the brine or the solution.

Step 2: The lithium-containing ion exchange resin beads or other suitable lithium adsorbent is regenerated with hydrochloric acid to produce a lithium chloride solution. The resin or adsorbing agent is regenerated to the proton form by HCl. Note that a lithium depleted solution may be pumped back to the salar reservoir or pond. As noted above, since there are typically water conservation limits in place, particularly in Chile, regarding the amount of salar brine that may be pumped out of the natural reservoirs, if the depleted solution is sent back to the reservoir, the producer may then produce more lithium without exceeding their legal limit regarding the amount of brine that they can pump.

Step 3: The lithium chloride solution is processed through the membrane electrochemical cell disclosed herein to produce lithium hydroxide and hydrochloric acid. Alternatively, lithium sulfate is process through the membrane electrochemical cell to produce lithium hydroxide and sulfuric acid.

Step 4: The lithium hydroxide is sold to market or otherwise removed from the process while the hydrochloric acid or sulfuric acid is recycled back to Step 2.

Note that in the process as shown in FIG. 24, air and electricity are fed to the membrane electrolysis cell. The overall reactions at the anode and cathode of the electrolysis are therefore:

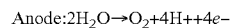
Anode:$2H_2O \rightarrow O_2 + 4H+ + 4e-$

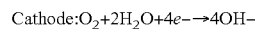
Cathode:$O_2 + 2H_2O + 4e- \rightarrow 4OH-$

Figure 25:
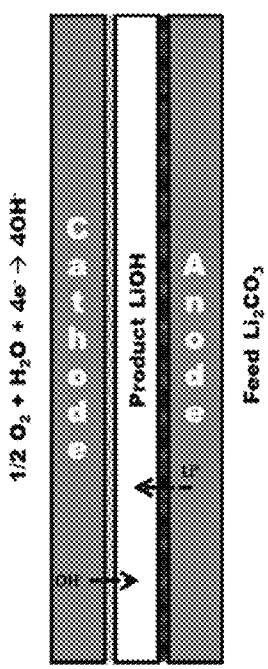
FIG. 25 shows a schematic of an embodiment of LiOH production from $Li_2CO_3$.

FIG. 25 shows yet another exemplary embodiment process for use of the membrane electrolysis cell utilizing the inventive gas diffusion electrode at the cathode of the cell. In this process, lithium carbonate and/or bicarbonate is directly converted in the membrane electrolysis cell to lithium hydroxide. In this case, the reactions are as follows:

Cathode:$O_2 + 2H_2O + 4e- \rightarrow 4OH-$

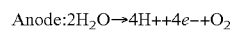
Anode:$2H_2O \rightarrow 4H+ + 4e- + O_2$

The lithium carbonate would react with the protons generated at the anode to liberate lithium ions, carbon dioxide and water as follows:

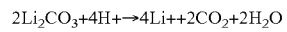
$2Li_2CO_3 + 4H+ \rightarrow 4Li+ + 2CO_2 + 2H_2O$

The liberated lithium ions would be transported towards the cathode to the lithium hydroxide compartment where they would combine with the hydroxide ions produced at the cathode and produce a lithium hydroxide solution.

It should be understood that in all of the foregoing Embodiments depicting the use of the inventive membrane electrolysis cell in recovery processes for lithium, that the role of GDEs essentially remain the same between the various applications: to produce OH- ions from a humidified oxygen/air gas stream. Regardless of the salt used as the feed brine (LiCl, NaCl, $Na_2SO_4$, $Li_2SO_4$), the cathode catalyst on the GDE always plays the same role.

Various non-limiting aspects of the invention may be summarized as follows:

Aspect 1: A process for recovering Li from a Li source, the process comprising the steps of:

receiving, in a membrane electrolysis cell, a salt-containing solution and a gas comprising $O_2$; and delivering, from the membrane electrolysis cell, recovered Li and/or reagent materials used in the process for recovering Li.

Aspect 2: The process of Aspect 1, further comprising:

receiving, in the membrane electrolysis cell, byproducts of the process for recovering Li; and delivering, from the membrane electrolysis cell, reagent materials used in the process for recovering Li.

Aspect 3: The process of Aspect 1 or Aspect 2, wherein the membrane electrolysis cell comprises
- an inlet through which the salt-containing solution is received into an interior of the membrane electrolysis cell;
- an anode positioned to extend within the interior of the membrane electrolysis cell and positioned in an anode compartment;
- a cathode comprising a gas diffusion electrode positioned to extend within the interior of the membrane electrolysis cell and positioned in a cathode compartment, the gas diffusion electrode including a diffusion layer configured to diffuse gas and a hydrophilic catalyst layer disposed on a surface of the diffusion layer, the hydrophilic catalyst layer having a hydrophilicity greater than that of the diffusion layer and the hydrophilic catalyst layer being configured to transport negative ions;
- a gas inlet positioned in the cathode compartment through which the gas comprising $O_2$ is introduced into contact with the gas diffusion electrode;
- a first ion exchange membrane interposed between the anode compartment and the hydrophilic catalyst layer of the gas diffusion electrode, the first ion exchange membrane being configured to exchange ions received from the anode to an opposed surface of the first ion exchange membrane; and
- at least one outlet through which the recovered Li and/or reagent materials used in the process for recovering Li is removed from an interior of the membrane electrolysis cell;
- wherein, in performing the process the salt-containing solution is received into the anode compartment and positive salt ions and negative salt ions are formed from the salt-containing solution in the anode compartment; and wherein the gas comprising $O_2$ is reduced at the cathode to form OH−;
- wherein in performing the process the positive salt ions move through the first ion exchange membrane to the opposed surface of the first ion exchange membrane; and
- wherein the positive salt ions combine with the OH− to form the recovered Li and/or reagent materials used in the process for recovering Li.

Aspect 4: The process of Aspect 3, the diffusion layer having a bi-layer construction formed from a plurality of diffusion sublayers, wherein the diffusion sublayers are hydrophobic and wherein water is transported away from the diffusion sublayers.

Aspect 5: The process of Aspect 3, the gas diffusion electrode further comprising a hydrophobic catalyst layer disposed on a surface of the diffusion layer that is opposite from the hydrophilic catalyst layer, the hydrophobic catalyst layer having a hydrophilicity less than that of the diffusion layer and being capable of transporting negative ions, wherein the OH− ions are transported through the hydrophobic catalyst layer.

Aspect 6: The process of Aspect 5, the membrane electrolysis cell further comprising:
- a second ion exchange membrane, the second ion exchange membrane being disposed on the hydrophilic catalyst layer of the gas diffusion electrode and being configured to exchange ions received from the hydrophilic catalyst layer of the gas diffusion electrode to an opposed surface of the second ion exchange membrane;
- wherein the first and second ion exchange membranes define a base build up compartment interposed between the cathode compartment and the anode compartment;
- wherein the OH− ions are exchanged through the second ion exchange membrane to the opposed surface of the second ion exchange membrane into the base build up compartment;
- wherein the OH− ions combine with the positive salt ions in the base build up compartment to form the recovered Li and/or reagent materials used in the process for recovering Li; and
- wherein the recovered Li and/or reagent materials used in the process for recovering Li is removed from the base buildup compartment.

Aspect 7: The process of Aspect 6, the membrane electrolysis cell further comprising:
- a third ion exchange membrane, the third ion exchange membrane being interposed between the first ion exchange membrane and the anode compartment, wherein the first and third ion exchange membranes define a salt depletion compartment interposed between the anode compartment and the base build up compartment, the third ion exchange membrane being configured to exchange ions received from the salt depletion compartment to an opposed surface of the third ion exchange membrane and into the anode compartment;
- wherein the salt containing solution is received into the salt depletion compartment and the positive salt ions and the negative salt ions are formed from the salt-containing solution in the salt depletion compartment; and
- wherein the negative salt ions are exchanged from the salt depletion compartment to the opposed surface of the third ion exchange membrane.

Aspect 8: The process of Aspect 7, the membrane electrolysis cell further comprising:
- a fourth ion exchange membrane, the fourth ion exchange membrane being interposed between the third ion exchange membrane and the anode compartment, wherein the third and the fourth ion exchange membranes define an acid build up compartment interposed between the anode compartment and the salt depletion compartment, the fourth ion exchange membrane being configured to exchange ions received from the anode compartment to an opposed surface of the fourth ion exchange membrane and into the acid build up compartment;
- wherein H+ ions are formed in the anode compartment and the H+ ions are exchanged from the anode compartment to the opposed surface of the fourth ion exchange membrane into the acid build up compartment;
- wherein the H+ ions and the negative salt ions together form an acid, wherein the acid comprises the recovered Li and/or reagent materials used in the process for recovering Li; and
- wherein the acid is removed from the acid build up compartment.

Aspect 9: The process of Aspect 8, wherein the first and fourth ion exchange membranes comprise cation exchange membranes and the second and third ion exchange membranes comprise anion exchange membranes.

Aspect 10: The process of any of Aspects 1-9, wherein the gas comprising $O_2$ is air.

Aspect 11: The process of any of Aspects 1-9, wherein the gas comprising oxygen is a waste stream from a nitrogen producing operation.

Aspect 12: The process of any of Aspects 1-11, wherein the Li source comprises a salar brine and the recovered Li comprises at least one of LiOH, $Li_2CO_3$, and/or LiCl.

Aspect 13: The process of any of Aspects 1-12, wherein in the receiving step the byproducts of the process for recovering Li comprise NaCl precipitated from the salar brine; and in the delivering step the reagent materials used in the process for recovering Li comprise HCl and NaOH.

Aspect 14: The process of any of Aspects 1-13 wherein the reagent materials are used to regenerate and/or desorb ions from an ion exchange resin used in the process for recovering lithium.

Aspect 15: The process of Aspect 13 wherein at least one of the HCl and the NaOH are used to regenerate and/or desorb ions from an ion exchange resin used in the process for recovering lithium.

Aspect 16: The process of any of Aspects 1-14, wherein the lithium source comprises lithium ore and the recovered lithium comprises at least one of LiOH, $Li_2CO_3$, and/or $Li_2SO_4$.

Aspect 17: The process of Aspect 16, wherein the recovered lithium comprises LiOH and the process further comprises a step of recycling a portion of the LiOH into the process for recovering lithium.

Aspect 18: The process of Aspect 17, further comprising a step of precipitating at least one of calcium and magnesium with the portion of the LiOH.

Aspect 19: The process of Aspect 17, further comprising a step of reacting the portion of the LiOH with $CO_2$ to produce $Li_2CO_3$, and further comprising a step of precipitating at least one of calcium and magnesium with the $Li_2CO_3$.

Aspect 20: The process of any of Aspects 1-16, wherein in the receiving step the byproducts of the process for recovering Li comprise $Na_2SO_4$ and in the delivering step the reagent materials used in the process for recovering lithium comprise $H_2SO_4$ and NaOH.

Aspect 21: The process of any of Aspects 1-14, wherein the lithium source comprises a salar brine and in the receiving step the salt-containing solution comprises LiCl and in the delivering step the recovered lithium comprises LiOH and the reagent materials used in the lithium recovery process comprise HCl.

Aspect 22: The process of Aspect 21, further comprising recycling a portion of the LiOH into the process for recovering lithium.

Aspect 23: The process of either of Aspect 21 or Aspect 22, further comprising a step of reacting the portion of the LiOH with $CO_2$ to produce $Li_2CO_3$, and further comprising a step of precipitating at least one of calcium and magnesium with the $Li_2CO_3$.

Aspect 24: The process of any of Aspects 1-14, wherein the lithium source comprises a salar brine and in the receiving step the salt-containing solution comprises LiCl and NaCl and in the delivering step the recovered lithium comprises LiOH and the reagent materials used in the lithium recovery process comprise HCl and NaOH.

Aspect 25: The process of Aspect 20, further comprising recycling a portion of the LiOH into the lithium recovery process.

Aspect 26: The process of any of Aspects 1-16, wherein the lithium source comprises lithium ore and in the receiving step the salt-containing solution comprises $Li_2SO_4$ from the lithium ore and in the delivering step the recovered lithium comprises LiOH and the reagent materials used in the lithium recovery process comprise $H_2SO_4$.

Aspect 27: The process of Aspect 18, wherein the salt-containing solution comprising LiCl is derived by contacting salar brine with an ion exchange resin, wherein the ion exchange resin is configured to adsorb lithium from the salar brine and to desorb the adsorbed lithium in the form of the solution comprising the LiCl in the presence of the HCl.

Aspect 28: The process of Aspect 26, wherein the salt-containing solution comprising $Li_2SO_4$ is derived by contacting a lithium containing-stream derived from the lithium ore with an ion exchange resin, wherein the ion exchange resin is configured to adsorb lithium from the lithium containing-stream derived from the lithium ore and to desorb the adsorbed lithium in the form of the solution comprising the $Li_2SO_4$ in the presence of the $H_2SO_4$.

Aspect 29: The process of Aspect 22, wherein the ion exchange resin is further configured to adsorb lithium directly from the salar brine.

Aspect 30: The process of Aspect 22, wherein the process further comprises a step of removal of boron from the salar brine prior to contacting the salar brine with the ion exchange resin.

Aspect 31: The process of any of Aspects 1-16, wherein the lithium source comprises $Li_2CO_3$.

Aspect 32: The process of Aspect 31, wherein in the receiving step the salt-containing solution comprises LiCl or $Li_2SO_4$.

Aspect 33: The process of Aspect 32, wherein in the delivering step the recovered lithium comprises LiOH and the reagent materials used in the lithium recovery process comprise HCl.

Aspect 34: The process of Aspect 32, wherein in the delivering step the recovered lithium comprises LiOH and the reagent materials used in the lithium recovery process comprise $H_2SO_4$.

Aspect 35: The process of Aspect 33, wherein the process further comprises recycling the HCl to dissolve the $Li_2CO_3$ to produce the LiCl.

Aspect 36: The process of Aspect 34, wherein the process further comprises recycling the $H_2SO_4$ to dissolve the $Li_2CO_3$ to produce the $Li_2SO_4$.

Aspect 37: The process of any of Aspects 1-11, wherein the lithium source comprises a brine derived from a lithium ion battery recovery process.

Aspect 38: A gas diffusion electrode for use in a membrane electrolysis cell, the gas diffusion electrode comprising:
  a diffusion layer configured to diffuse a gas;
  a hydrophilic catalyst layer disposed on a surface of the diffusion layer, the hydrophilic catalyst layer having a hydrophilicity greater than that of the diffusion layer and being capable of transporting negative ions; and
  an ion exchange membrane disposed on a surface of the hydrophilic catalyst layer, the ion exchange membrane being configured to exchange ions from the hydrophilic catalyst layer to an opposed surface of the ion exchange membrane.

Aspect 39: The gas diffusion electrode of Aspect 38, the diffusion layer having a bi-layer construction formed from a plurality of diffusion sublayers.

Aspect 40: The gas diffusion electrode of either of Aspect 38 or Aspect 39, further comprising a hydrophobic catalyst layer disposed on a surface of the diffusion layer that is opposite from the hydrophilic catalyst layer, the hydrophobic catalyst layer having a hydrophilicity less than that of the diffusion layer and being capable of transporting negative ions.

Aspect 41: The gas diffusion electrode of any of Aspects 38-40, the hydrophilic catalyst layer comprising platinum and carbon and an anion exchange ionomer.

Aspect 42: The gas diffusion electrode of either of Aspect 40 or Aspect 41, the hydrophobic catalyst layer comprising platinum and carbon and an anion exchange ionomer.

Aspect 43: The gas diffusion electrode of any of Aspects 40-42, the hydrophobic catalyst layer comprising PTFE.

Aspect 44: The gas diffusion electrode of any of Aspects 40-43, at least one of the hydrophilic catalyst layer and the hydrophobic catalyst layer being configured as an oxygen depolarized cathode to catalyze the following reaction: $O_2+2H_2O+4e^- \rightarrow 4OH^-$.

Aspect 45: The gas diffusion electrode of any of Aspects 38-44, said ion exchange membrane being an anion exchange membrane, thereby forming a cathode.

Aspect 46: A method of producing a gas diffusion electrode for use in a membrane electrolysis cell, the method comprising:
  disposing a hydrophilic catalyst layer on a surface of a diffusion layer, the hydrophilic catalyst layer having a hydrophilicity greater than that of the diffusion layer; and
  disposing an ion exchange membrane on a surface of the catalyst layer, the ion exchange membrane being configured to exchange ions from the catalyst layer to an opposed surface of the ion exchange membrane and to reduce or prevent flooding of the catalyst layer.

Aspect 47: The method of Aspect 46, further comprising disposing a hydrophobic catalyst layer on a surface of the diffusion layer that is opposite from the hydrophilic catalyst layer, the hydrophobic catalyst layer having a hydrophilicity less than that of the diffusion layer.

Aspect 48: The method of either of Aspect 46 or Aspect 47, the diffusion layer having a bilayer construction formed from a plurality of diffusion sublayers, the hydrophilic catalyst layer disposing step including disposing the hydrophilic catalyst layer on a surface of one of the diffusion sublayers, and the hydrophobic catalyst layer disposing step including disposing the hydrophobic catalyst layer on an opposite surface of another one of the diffusion sublayers.

Aspect 49: The method of any of Aspects 46-48, further comprising combining the diffusion sublayers to form the diffusion layer.

Aspect 50: The method of any of Aspects 46-49, at least one of the hydrophilic catalyst layer and the hydrophobic catalyst layer being formed from an ink and at least one of the hydrophilic catalyst layer disposing step and the hydrophobic catalyst layer disposing step comprising applying the ink on the surface of the diffusion layer.

Aspect 51: A membrane electrolysis cell for processing a salt-containing solution, the membrane electrolysis cell comprising:
  an inlet through which the salt-containing solution is introduced into an interior of the membrane electrolysis cell;
  an anode positioned to extend within the interior of the membrane electrolysis cell and positioned in an anode compartment;
  a cathode comprising a gas diffusion electrode positioned to extend within the interior of the membrane electrolysis cell and positioned in a cathode compartment, the gas diffusion electrode including a diffusion layer configured to diffuse gas and a hydrophilic catalyst layer disposed on a surface of the diffusion layer, the hydrophilic catalyst layer having a hydrophilicity greater than that of the diffusion layer and the hydrophilic catalyst layer being configured to transport negative ions;
  a gas inlet through which a gas comprising $O_2$ is introduced into contact with the gas diffusion electrode;
  a first ion exchange membrane interposed between the anode compartment and the hydrophilic catalyst layer of the gas diffusion electrode, the first ion exchange membrane being configured to exchange ions received from the anode to an opposed surface of the first ion exchange membrane; and
  at least one outlet through which a product of the salt solution is removed from an interior of the membrane electrolysis cell.

Aspect 52: The membrane electrolysis cell of Aspect 51, further comprising
  a second ion exchange membrane, the second ion exchange membrane being disposed on the hydrophilic catalyst layer of the gas diffusion electrode and being configured to exchange ions received from the hydrophilic catalyst layer of the gas diffusion electrode to an opposed surface of the third ion exchange membrane;
  wherein the first and second ion exchange membranes define a base build up compartment interposed between the cathode compartment and the anode compartment.

Aspect 53: The membrane electrolysis cell of Aspect 52, further comprising
  a third ion exchange membrane, the third ion exchange membrane being interposed between the first ion exchange membrane and the anode compartment, wherein the first and third ion exchange membranes define a salt depletion compartment interposed between the anode compartment and the base build up compartment, the third ion exchange membrane being configured to exchange ions received from the salt depletion compartment to an opposed surface of the third ion exchange membrane and into the anode compartment.

Aspect 54: The membrane electrolysis cell of Aspect 53, further comprising:
  a fourth ion exchange membrane, the fourth ion exchange membrane being interposed between the third ion exchange membrane and the anode compartment, wherein the third and the fourth ion exchange membranes define an acid build up compartment interposed between the anode compartment and the salt depletion compartment, the fourth ion exchange membrane being configured to exchange ions received from the anode compartment to an opposed surface of the fourth ion exchange membrane and into the acid build up compartment.

Aspect 55: The membrane electrolysis cell of Aspect 54 wherein the first and fourth ion exchange membranes comprise cation exchange membranes and the second and third ion exchange membranes comprise anion exchange membranes.

Aspect 56: The membrane electrolysis cell of any of Aspects 51-55 wherein the hydrophilic catalyst layer comprises platinum and carbon and an anion exchange ionomer.

Aspect 57: A process for purifying or concentrating LiOH using a membrane electrolysis cell, the steps of the process comprising the steps of:
  receiving, in a membrane electrolysis cell, a feed solution comprising LiOH and a gas comprising $O_2$; and
  delivering, from the membrane electrolysis cell, a product solution comprising a purified LiOH solution and/or a concentrated LiOH solution.

Aspect 58: A process for producing LiOH using a membrane electrolysis cell, the steps of the process comprising the steps of:
receiving, in a membrane electrolysis cell, a feed solution comprising $Li_2CO_3$ and a gas comprising $O_2$; and
delivering, from the membrane electrolysis cell, a product solution comprising a purified LiOH solution and/or a concentrated LiOH solution.

EXAMPLES

Experiments were conducted to demonstrate the effect of the inventive bilayer gas diffusion electrodes used as the oxygen depolarized cathodes compared to the single layer ODC.

FIG. 26 shows a current vs. time plot for a membrane electrolysis cell utilizing a single layer ODC. As can be seen in the plot, a single layer GDE using $O_2$ at the cathode after about 11 hours of testing starts to produce $H_2$ which is an indication of the ineffectiveness of the GDE to promote the reaction: $O_2+2H_2O+4e-\rightarrow 4OH-$.

FIGS. 27 and 28, respectively, demonstrate the effectiveness of the bilayer ODC's used with either $O_2$ at the cathode or air as the oxygen source at the cathode. Using either $O_2$ or air, it can be seen that hydrogen is not evolved, even after more than 30 hours of continuous operation.

In some embodiments, the invention herein can be construed as excluding any element or process that does not materially affect the basic and novel characteristics of the composition or process. Additionally, in some embodiments, the invention can be construed as excluding any element or process not specified herein.

As noted previously, although the invention is illustrated and described herein with reference to specific embodiments, the invention is not intended to be limited to the details shown. Rather, various modifications may be made in the details within the scope and range of equivalents of the claims and without departing from the invention.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A process for producing a base product, the process comprising the steps of:
receiving, in a membrane electrolysis cell, a salt-containing solution comprising positive salt ions and negative salt ions, and a gas comprising $O_2$; and
delivering the base product from the membrane electrolysis cell, wherein the membrane electrolysis cell comprises:
an anode positioned to extend within the interior of the membrane electrolysis cell and positioned in an anode compartment;
a cathode comprising a gas diffusion electrode positioned to extend within the interior of the membrane electrolysis cell and positioned in a cathode compartment, the gas diffusion electrode comprising a first diffusion layer configured to diffuse gas and a first catalyst layer disposed on a surface of the first diffusion layer, the first catalyst layer having a hydrophilicity greater than that of the first diffusion layer and the first catalyst layer being configured to transport negative ions;
a base build up compartment and a salt depletion compartment interposed between the cathode compartment and the anode compartment, the base build up compartment is interposed between the cathode compartment and the salt depletion compartment, and the salt depletion compartment is interposed between the base build up compartment and the anode compartment;
a first anion exchange membrane, the first anion exchange membrane being disposed on the first catalyst layer of the gas diffusion electrode and being configured to exchange ions received from the first catalyst layer of the gas diffusion electrode to an opposed surface of the first anion ion exchange membrane into the base build up compartment;
a cation exchange membrane interposed between the salt depletion compartment and the base build up compartment, the cation exchange membrane being configured to exchange ions received from the salt depletion compartment to an opposed surface of the cation exchange membrane into the base build up compartment;
a second anion exchange membrane interposed between the salt depletion compartment and the anode compartment, the second anion exchange membrane being configured to exchange ions received from the salt depletion compartment to an opposed surface of the second anion exchange membrane into the anode compartment;
an inlet through which the salt-containing solution is received into the salt depletion compartment;
a gas inlet positioned in the cathode compartment through which the gas comprising $O_2$ is introduced into contact with the gas diffusion electrode; and
an outlet through which the base product is removed from the base buildup compartment;
wherein in performing the process:
the salt-containing solution is received into the salt depletion compartment;
the positive salt ions migrate through the cation exchange membrane to the opposed surface of the cation exchange membrane into the base build up compartment;
the gas comprising $O_2$ is reduced at the cathode to form $OH^-$;
the $OH^-$ ions migrate through the first anion exchange membrane to the opposed surface of the first anion exchange membrane into the base build up compartment;
the $OH^-$ ions combine with the positive salt ions in the base build up compartment to produce the base product; and
the base product is removed from the base build up compartment.

2. The process of claim 1, wherein the gas diffusion electrode further comprises a hydrophobic catalyst layer disposed on the opposite side of the first diffusion layer from the first catalyst layer.

3. The process of claim 1, wherein the gas diffusion electrode further comprises a second diffusion layer disposed on the opposite side of the first diffusion layer from the first catalyst layer.

4. The process of claim 3, wherein the gas diffusion electrode further comprises a hydrophobic catalyst layer disposed on the second diffusion layer.

5. The process of claim 1, wherein the first diffusion layer is hydrophobic.

6. The process of claim 5, wherein the first catalyst layer is hydrophobic or hydrophilic.

7. The process of claim 3, wherein the second diffusion layer is hydrophobic.

8. The process of claim 1, wherein the base product comprises NaOH, KOH, or LiOH, or a mixture thereof.

9. The process of claim 1, wherein the salt-containing solution comprises $NaCl$, $Na_2SO_4$, $LiCl$, $Li_2SO_4$, $Li_2CO_3$, or $LiHCO_3$.

10. The process of claim 1, wherein the gas comprising oxygen is air, humidified air, or a waste stream from a nitrogen producing operation.

11. A process for producing a base product, the process comprising the steps of:
receiving, in a membrane electrolysis cell, a salt-containing solution comprising positive salt ions and negative salt ions, and a gas comprising O2; and
delivering the base product from the membrane electrolysis cell, wherein the membrane electrolysis cell comprises:
an anode positioned to extend within the interior of the membrane electrolysis cell and positioned in an anode compartment;
a cathode comprising a gas diffusion electrode positioned to extend within the interior of the membrane electrolysis cell and positioned in a cathode compartment, the gas diffusion electrode comprising a first diffusion layer configured to diffuse gas and a first catalyst layer disposed on a surface of the diffusion layer, the first catalyst layer having a hydrophilicity greater than that of the first diffusion layer and the first catalyst layer being configured to transport negative ions;
a base build up compartment, a salt depletion compartment and an acid build up compartment interposed between the cathode compartment and the anode compartment, the base build up compartment is interposed between the cathode compartment and the salt depletion compartment, the salt depletion compartment is interposed between the base build up compartment and the acid build up compartment, and the acid build up compartment is interposed between the salt depletion compartment and the anode compartment;
a first anion exchange membrane, the first anion exchange membrane being disposed on the first catalyst layer of the gas diffusion electrode and being configured to exchange ions received from the first catalyst layer of the gas diffusion electrode to an opposed surface of the first anion ion exchange membrane into the base build up compartment;
a first cation exchange membrane interposed between the salt depletion compartment and the base build up compartment, the first cation exchange membrane being configured to exchange ions received from the salt depletion compartment to an opposed surface of the first cation exchange membrane into the base build up compartment;
a second anion exchange membrane interposed between the salt depletion compartment and the acid build up compartment, the second anion exchange membrane being configured to exchange ions received from the salt depletion compartment to an opposed surface of the second anion exchange membrane into the acid build up compartment;
a second cation exchange membrane interposed between the acid build up compartment and the anode compartment, the second cation exchange membrane being configured to exchange ions received from the anode compartment to an opposed surface of the second cation exchange membrane into the acid build up compartment;
an inlet through which the salt-containing solution is received into the salt depletion compartment;
a gas inlet positioned in the cathode compartment through which the gas comprising O2 is introduced into contact with the gas diffusion electrode; and
an outlet through which the base product is removed from the base buildup compartment;
wherein in performing the process:
the salt-containing solution is received into the salt depletion compartment;
the positive salt ions migrate through the first cation exchange membrane to the opposed surface of the first cation exchange membrane into the base build up compartment;
the gas comprising $O_2$ is reduced at the cathode to form $OH^-$;
the $OH^-$ ions migrate through the first anion exchange membrane to the opposed surface of the first anion exchange membrane into the base build up compartment;
the $OH^-$ ions combine with the positive salt ions in the base build up compartment to produce the base product; and
the base product is removed from the base build up compartment.

12. The process of claim 11, wherein the gas diffusion electrode further comprises a hydrophobic catalyst layer disposed on the opposite side of the first diffusion layer from the first catalyst layer.

13. The process of claim 11, wherein the gas diffusion electrode further comprises a second diffusion layer disposed on the opposite side of the first diffusion layer from the first catalyst layer.

14. The process of claim 13, wherein the gas diffusion electrode further comprises a hydrophobic catalyst layer disposed on the second diffusion layer.

15. The process of claim 11, wherein the first diffusion layer is hydrophobic.

16. The process of claim 15, wherein the first catalyst layer is hydrophobic or hydrophilic.

17. The process of claim 13, wherein the second diffusion layer is hydrophobic.

18. The process of claim 11, wherein the negative salt ions migrate through the second anion exchange membrane to the opposed surface of the second anion exchange membrane into the acid build up compartment, $H^+$ ions are formed in the anode compartment and migrate through the second cation exchange membrane into the acid build up compartment, the $H^+$ ions and the negative ions together form an acid in the acid build up compartment, and the acid is removed from the acid build up compartment.

19. The process of claim 18, wherein the acid comprises HCl or $H_2SO_4$.

20. The process of claim 11, wherein the base product comprises NaOH, KOH, or LiOH, or a mixture thereof.

21. The process of claim 11, wherein the salt-containing solution comprises $NaCl$, $Na_2SO_4$, $LiCl$, $Li_2SO_4$, $Li_2CO_3$, or $LiHCO_3$.

22. The process of claim 11, wherein the gas comprising oxygen is air, humidified air, or a waste stream from a nitrogen producing operation.

* * * * *